US012092994B2

(12) United States Patent
Kim et al.

(10) Patent No.: US 12,092,994 B2
(45) Date of Patent: Sep. 17, 2024

(54) COMPLEX LIGHT MODULATOR, HOLOGRAPHIC DISPLAY APPARATUS, AND METHOD OF GENERATING HOLOGRAM PATTERN

(71) Applicants: SAMSUNG ELECTRONICS CO., LTD., Suwon-si (KR); Korea University Research and Business Foundation, Sejong Campus, Sejong-si (KR)

(72) Inventors: Yunhee Kim, Seoul (KR); Hwi Kim, Sejong-si (KR); Jonghyun Lee, Sejong-si (KR); Hoon Song, Yongin-si (KR)

(73) Assignees: SAMSUNG ELECTRONICS CO., LTD., Suwon-si (KR); Korea University Research and Business Foundation, Sejong Campus, Sejong-si (KR)

( * ) Notice: Subject to any disclaimer, the term of this patent is extended or adjusted under 35 U.S.C. 154(b) by 145 days.

(21) Appl. No.: 17/574,811

(22) Filed: Jan. 13, 2022

(65) Prior Publication Data
US 2022/0299937 A1    Sep. 22, 2022

(30) Foreign Application Priority Data
Mar. 19, 2021 (KR) .................... 10-2021-0036076

(51) Int. Cl.
*G03H 1/08* (2006.01)
*G03H 1/00* (2006.01)
(Continued)

(52) U.S. Cl.
CPC ............. *G03H 1/0005* (2013.01); *G03H 1/02* (2013.01); *G03H 1/2205* (2013.01); *G03H 2001/0088* (2013.01); *G03H 2001/0224* (2013.01)

(58) Field of Classification Search
CPC ...... G03H 1/0005; G03H 1/02; G03H 1/2205; G03H 2001/0088; G03H 2001/0224
(Continued)

(56) References Cited

U.S. PATENT DOCUMENTS 7,636,184 B2    12/2009  Schwerdtner
7,808,717 B2    10/2010  Kuiper et al.
(Continued)

FOREIGN PATENT DOCUMENTS

DE   10 2009 044 910 A1   12/2010
JP         4294526 B2       7/2009
(Continued)

OTHER PUBLICATIONS

Burckhardt, C., "A Simplification of Lee's Method of Generating Holograms by Computer", 1970, Applied Optics, vol. 9, No. 8, 1 page total.
(Continued)

*Primary Examiner* — Albert Kir
(74) *Attorney, Agent, or Firm* — Sughrue Mion, PLLC

(57) ABSTRACT

Provided is a complex light modulator including a phase modulator, and an amplitude modulator, wherein the phase modulator and the amplitude modulator are configured to generate a first complex pixel having first complex light modulation characteristics and a second complex pixel having second complex light modulation characteristics, wherein the first complex pixel includes first sub-complex pixels that are provided in a 3×3 format and are configured to implement the first complex light modulation character-
(Continued)

istics, wherein the second complex pixel includes second sub-complex pixels that are provided in a 3×3 format and are configured to implement the second complex light modulation characteristics, and wherein the first complex pixel and the second complex pixel respectively include a first overlapping pixel that is included in the first sub-complex pixels and the second sub-complex pixels.

20 Claims, 12 Drawing Sheets

(51) Int. Cl.
*G03H 1/02* (2006.01)
*G03H 1/22* (2006.01)
*G03H 1/26* (2006.01)

(58) Field of Classification Search
USPC .......................................................... 348/40
See application file for complete search history.

(56) References Cited

U.S. PATENT DOCUMENTS

| | | | |
|---|---|---|---|
| 8,077,377 B2 | 12/2011 | Sandstrom | |
| 8,218,211 B2 | 7/2012 | Kroll et al. | |
| 9,651,918 B2* | 5/2017 | Pyun | G03H 1/0476 |
| 11,303,858 B1* | 4/2022 | Peckham | H04N 13/363 |
| 11,561,134 B2* | 1/2023 | Wang | H03M 7/3066 |
| 2010/0033781 A1 | 2/2010 | Leister | |
| 2010/0195178 A1 | 8/2010 | Leister et al. | |
| 2010/0289870 A1 | 11/2010 | Leister | |
| 2012/0176665 A1 | 7/2012 | Song et al. | |
| 2013/0335795 A1 | 12/2013 | Song et al. | |
| 2014/0016051 A1 | 1/2014 | Kroll et al. | |
| 2014/0210960 A1 | 7/2014 | Sung et al. | |
| 2014/0285862 A1 | 9/2014 | Song et al. | |
| 2014/0285863 A1 | 9/2014 | Pyun et al. | |
| 2015/0160614 A1 | 6/2015 | Sung et al. | |
| 2018/0129105 A1 | 5/2018 | Kim et al. | |
| 2019/0056635 A1 | 2/2019 | Kim et al. | |
| 2019/0278225 A1 | 9/2019 | Futterer et al. | |
| 2019/0286053 A1* | 9/2019 | Ozcan | H04N 23/951 |
| 2019/0361396 A1 | 11/2019 | Christmas | |
| 2020/0264559 A1 | 8/2020 | Sato | |
| 2020/0278642 A1 | 9/2020 | Kim et al. | |
| 2021/0181678 A1 | 6/2021 | Kim et al. | |
| 2021/0370099 A1* | 12/2021 | Siebers | A61N 5/1075 |
| 2022/0163918 A1* | 5/2022 | Brooker | G03H 1/0443 |
| 2022/0179360 A1 | 6/2022 | Leister et al. | |
| 2022/0217301 A1* | 7/2022 | Ballard | H04N 7/144 |

FOREIGN PATENT DOCUMENTS

| | | |
|---|---|---|
| KR | 10-2020-0105061 A | 9/2020 |
| KR | 10-2021-0074157 A | 6/2021 |
| WO | 2004/051323 A1 | 6/2004 |
| WO | 2020/193489 A1 | 10/2020 |

OTHER PUBLICATIONS

Hsueh, et al., "Computer-generated double-phase holograms", 1978, Applied Optics, vol. 17, No. 24, 10 pages total.
Communication dated Jul. 18, 2022 issued by the European Patent Office in European Application No. 22161042.1.

* cited by examiner

COMPLEX LIGHT MODULATOR, HOLOGRAPHIC DISPLAY APPARATUS, AND METHOD OF GENERATING HOLOGRAM PATTERN

CROSS-REFERENCE TO RELATED APPLICATION

This application is based on and claims priority under 35 U.S.C. § 119 to Korean Patent Application No. 10-2021-0036076, filed on Mar. 19, 2021, in the Korean Intellectual Property Office, the disclosure of which is incorporated by reference herein in its entirety.

BACKGROUND

1. Field

Example embodiments of the present disclosure relate to complex light modulators, holographic display apparatuses, and methods of generating hologram patterns.

2. Description of Related Art

Methods such as glasses-type methods and non-glasses-type methods are widely used to realize three-dimensional (3D) images. Examples of glasses-type methods include deflected glasses-type methods and shutter glasses-type methods, and examples of non-glasses-type methods include lenticular methods and parallax barrier methods. When these methods are used, there is a limitation with regard to the number of viewpoints that may be implemented due to binocular parallax. Also, these methods make the viewers feel tired due to the difference between the depth perceived by the brain and the focus of the eyes.

Holographic 3D image display methods, which provide full parallax and are capable of making the depth perceived by the brain consistent with the focus of the eyes, have been considered. According to such a holographic display technique, when light is radiated onto a hologram pattern having recorded thereon an interference pattern obtained by interference between object light reflected from an original object and reference light, the light is diffracted and an image of the original object is reproduced. When a currently considered holographic display technique is used, a computer-generated hologram (CGH), rather than a hologram pattern obtained by directly exposing an original object to light, is provided as an electrical signal to a spatial light modulator. Then, the spatial light modulator forms a hologram pattern and diffracts light according to an input CGH signal, thereby generating a 3D image.

SUMMARY

One or more example embodiments provide complex light modulators having high resolution and low noise.

One or more example embodiments also provide holographic display apparatuses having high resolution and low noise.

One or more example embodiments also provide methods of generating hologram patterns for reproducing a holographic image having high resolution and low noise.

Additional aspects will be set forth in part in the description which follows and, in part, will be apparent from the description, or may be learned by practice of example embodiments.

According to an aspect of an example embodiment, there is provided a complex light modulator including a phase modulator, and an amplitude modulator, wherein the phase modulator and the amplitude modulator are configured to generate a first complex pixel having first complex light modulation characteristics and a second complex pixel having second complex light modulation characteristics, wherein the first complex pixel includes first sub-complex pixels that are provided in a 3×3 format and are configured to implement the first complex light modulation characteristics, wherein the second complex pixel includes second sub-complex pixels that are provided in a 3×3 format and are configured to implement the second complex light modulation characteristics, and wherein the first complex pixel and the second complex pixel respectively include a first overlapping pixel that is included in the first sub-complex pixels and the second sub-complex pixels.

The phase modulator and the amplitude modulator may be further configured to generate a third complex pixel having third complex light modulation characteristics, wherein a plurality of first overlapping pixels are provided, wherein the third complex pixel includes third sub-complex pixels that are provided in a 3×3 format and implement the third complex light modulation characteristics, wherein the first complex pixel, the second complex pixel, and the third complex pixel respectively includes one of the plurality of first overlapping pixels, and wherein the one of the plurality of first overlapping pixels is included in the third sub-complex pixels.

The phase modulator and the amplitude modulator may be further configured to generate a fourth complex pixel having fourth complex light modulation characteristics, wherein the fourth complex pixel includes fourth sub-complex pixels that are provided in a 3×3 format and are configured to implement the fourth complex light modulation characteristics, wherein the first complex pixel, the second complex pixel, the third complex pixel, and the fourth complex pixel respectively includes the one of the plurality of first overlapping pixels, and wherein the one of the plurality of first overlapping pixels is included in the fourth complex pixels.

The first complex pixel and the fourth complex pixel further respectively may include a second overlapping pixel that is included in the first sub-complex pixels and the fourth sub-complex pixels.

The complex light modulator may further include a processor configured to provide a holographic data signal to the amplitude modulator, wherein the amplitude modulator includes a spatial light modulator.

The phase modulator may include a phase plate having a plurality of patterns, wherein the plurality of patterns may correspond to the first sub-complex pixels and the second sub-complex pixels on a one-to-one basis, and wherein phases of the first sub-complex pixels and phases of the second sub-complex pixels may correspond to thicknesses of the plurality of patterns.

Phases of the first sub-complex pixels may form point symmetry, and phases of the second sub-complex pixels may form point symmetry.

According to another aspect of an example embodiment, there is provided a holographic display apparatus including a backlight unit configured to provide light having coherence, a Fourier lens configured to focus the light, and a complex light modulator provided in a path of the light, wherein the complex light modulator includes a first complex pixel having first complex light modulation characteristics and a second complex pixel having second complex light modulation characteristics, wherein the first complex pixel includes first sub-complex pixels that are provided in a 3×3 format and are configured to implement the first complex light modulation characteristics, wherein the second complex pixel includes second sub-complex pixels that are provided in a 3×3 format and are configured to implement the second complex light modulation characteristics, and wherein the first complex pixel and the second complex pixel respectively includes a first overlapping pixel that is included in the first sub-complex pixels and the second sub-complex pixels.

The complex light modulator may further include a third complex pixel having third complex light modulation characteristics, wherein a plurality of first overlapping pixels are provided, wherein the third complex pixel includes third sub-complex pixels that are provided in a 3×3 format and are configured to implement the third complex light modulation characteristics, wherein the first complex pixel, the second complex pixel, and the third complex pixel respectively includes one of the plurality of first overlapping pixels, and wherein the one of the plurality of first overlapping pixels is included in the third sub-complex pixels.

The complex light modulator may further include a fourth complex pixel having fourth complex light modulation characteristics, wherein the fourth complex pixel includes fourth sub-complex pixels that are provided in a 3×3 format and implement the fourth complex light modulation characteristics, wherein the first complex pixel, the second complex pixel, the third complex pixel, and the fourth complex pixel respectively includes the one of the plurality of first overlapping pixels, and wherein the one of the plurality of first overlapping pixels is included in the fourth sub-complex pixels.

The first complex pixel and the fourth complex pixel may further respectively include a second overlapping pixel that is included in the first sub-complex pixels and the fourth sub-complex pixels.

The complex light modulator may further include a phase modulator and an amplitude modulator that are configured to define the first complex pixel and the second complex pixel.

The holographic display apparatus may further include a diffraction prevention film provided in the path of the light, wherein the diffraction prevention film is configured to enlarge a beam diameter of the light.

The holographic display apparatus may further include a prism array provided in the path of the light, wherein the prism array is configured to adjust a light path of a first beam passing through the first complex pixel, such that the first beam travels in a first direction, and adjusts a light path of a second beam passing through the second complex pixel, such that the second beam travels in a second direction different from the first direction.

Phases of the first sub-complex pixels may form point symmetry, and phases of the second sub-complex pixels may form point symmetry.

According to yet another aspect of an example embodiment, there is provided a method of generating a hologram pattern, the method including determining complex light modulation characteristics of complex pixels provided in two dimensions, determining light modulation characteristics of sub-complex pixels that are provided in a 3×3 format and are included in each of the complex pixels, based on the complex light modulation characteristics of the complex pixels, and generating overlapping pixels by overlapping target pixels, which are immediately adjacent to each other and have a same phase, among the sub-complex pixels included in each of complex pixels adjacent to each other among the complex pixels, wherein the adjacent complex pixels respectively include the overlapping pixels based on generating the overlapping pixels.

The light modulation characteristics of the sub-complex pixels provided in the 3×3 format may be determined such that amplitudes of the sub-complex pixels form point symmetry and phases of the sub-complex pixels form point symmetry.

Phases of the overlapping pixels may be the same as phases of corresponding overlapping target pixels, wherein amplitudes of the overlapping pixels may be equal to a sum of amplitudes of the corresponding overlapping target pixels, and each of the overlapping pixels may be generated by overlapping the corresponding overlapping target pixels.

The complex light modulation characteristics of the complex pixels may be determined based on amplitude information and phase information of a holographic image corresponding to the complex pixels based on a resolution of a complex light modulator obtained based on generating the overlapping pixels.

Among the sub-complex pixels provided in the 3×3 format, which include the overlapping pixels, phases of sub-complex pixels respectively provided at positions (1,1), (1,3), (2,2), (3,1), and (3,3) may be 0°, phases of sub-complex pixels respectively located at positions (1,2) and (3,2) are 120°, and phases of sub-complex pixels respectively located at positions (2,1) and (2,3) may be 240°, where a sub-complex pixel at a position (m,n) is provided at an mth row and nth column of the 3×3 format.

According to yet another aspect of an example embodiment, there is provided a complex light modulator including an amplitude modulator configured to modulate an amplitude of light, a phase modulator configured to modulate a phase of the light, and a processor configured to provide a holographic data signal to the amplitude modulator, wherein the phase modulator and the amplitude modulator are further configured to generate a first complex pixel having first complex light modulation characteristics and a second complex pixel having second complex light modulation characteristics, wherein the first complex pixel includes first sub-complex pixels that are provided in a 3×3 format, wherein the second complex pixel includes second sub-complex pixels that are provided in a 3×3 format, and wherein the first complex pixel and the second complex pixel respectively include a first overlapping pixel, the first overlapping pixel being one of the first sub-complex pixels and one of the second sub-complex pixels.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1:
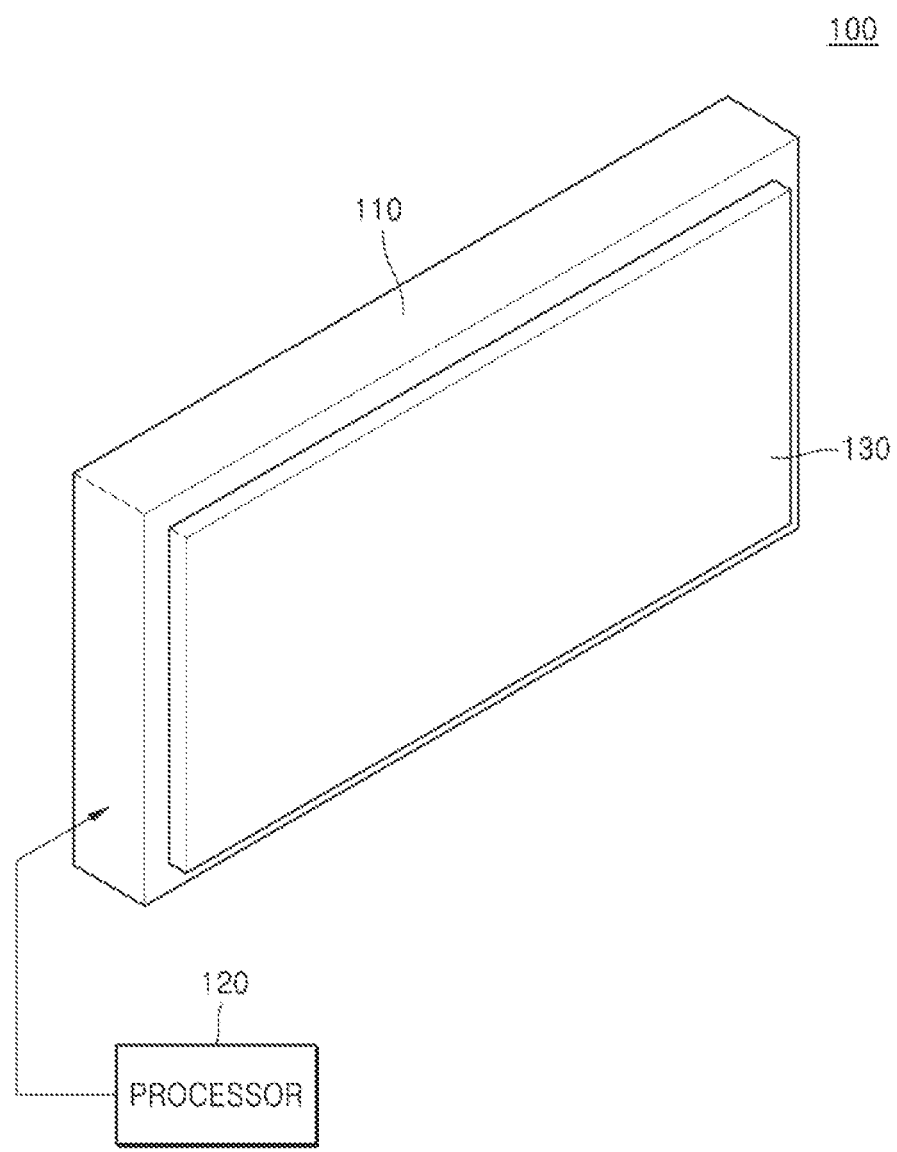
FIG. 1 is a perspective view of a complex light modulator according to an example embodiment.

Example embodiments will now be described in detail with reference the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. In the following drawings, the same reference numerals refer to the same components, and the size of each component in the drawings may be exaggerated for clarity and convenience of description. Further, the example embodiments described below are merely example, and various modifications are possible from these embodiments.

Hereinafter, what is described as "on" may include not only those directly above by contact, but also those above non-contact.

The terms of a singular form may include plural forms unless otherwise specified. In addition, when a certain part "comprises" or "includes" a certain component, it means that other components may be further included rather than excluding other components unless otherwise stated.

In addition, terms such as " . . . unit" described in the specification mean a unit that processes at least one function or operation.

Figure 2:
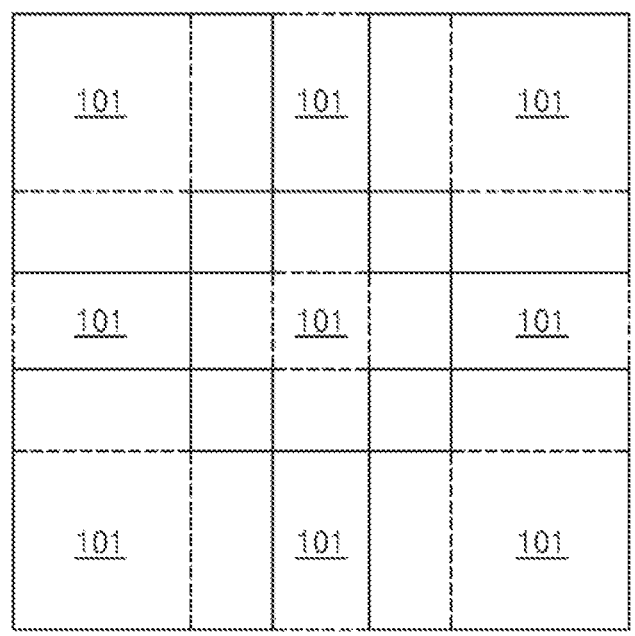
FIG. 2 is a conceptual diagram illustrating complex pixels.
Figure 3:
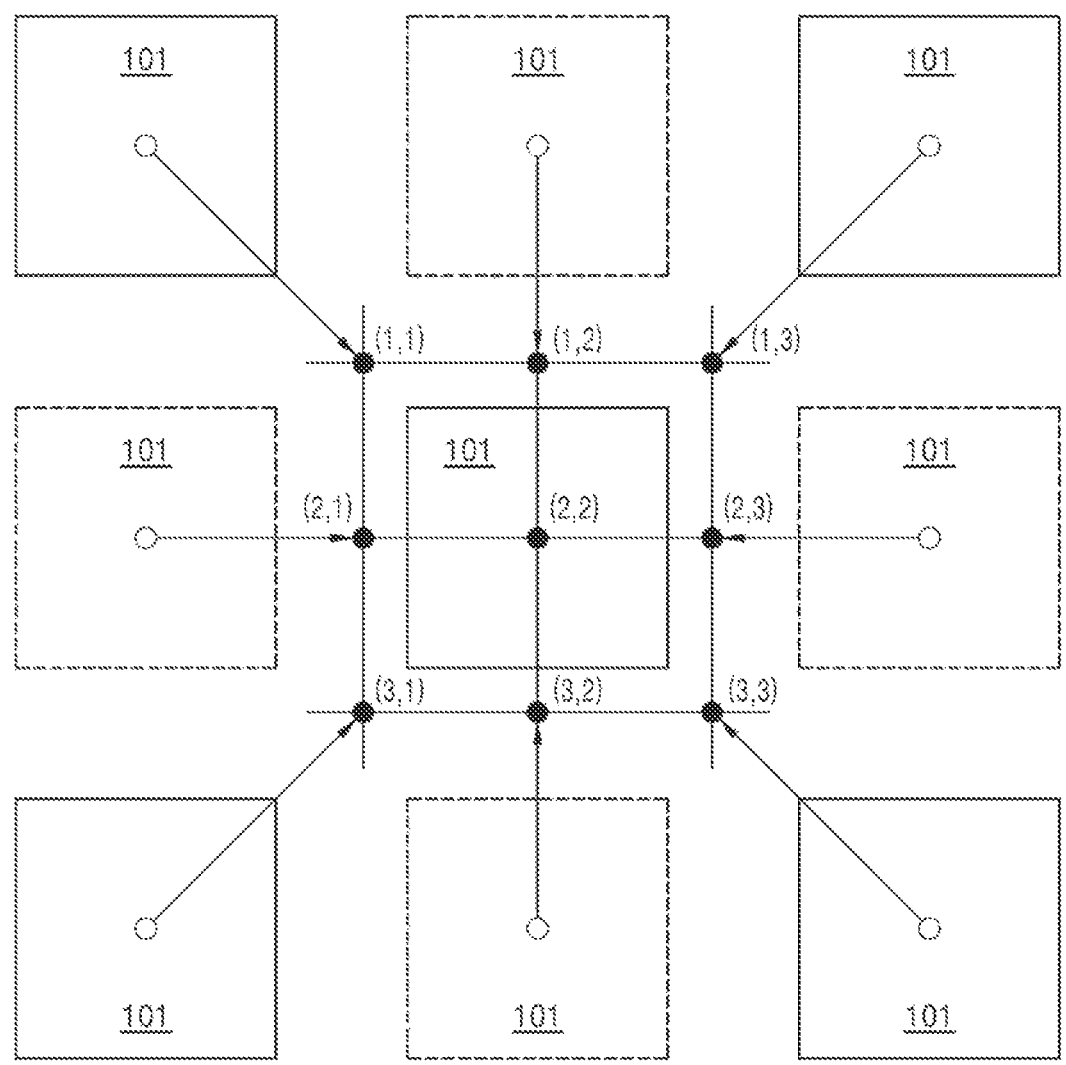
FIG. 3 is a conceptual diagram illustrating complex pixels.
Figure 4:
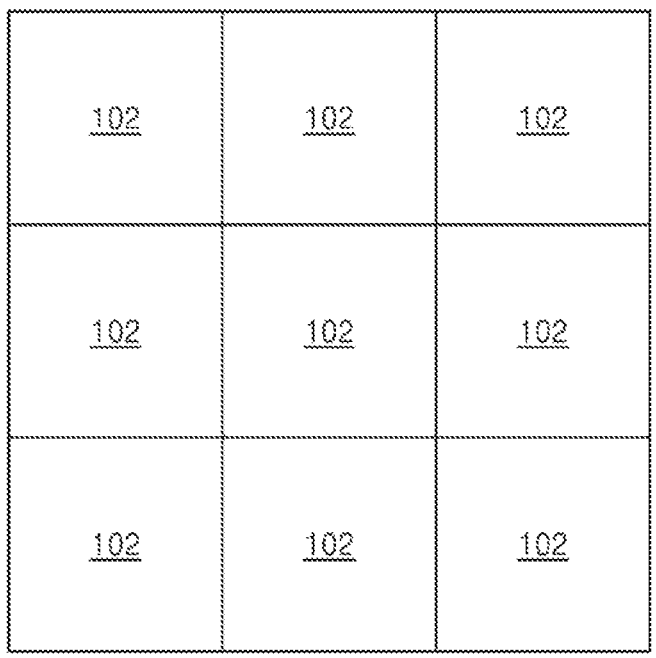
FIG. 4 is a conceptual diagram illustrating sub-complex pixels.

FIG. 1 is a perspective view of a complex light modulator 100 according to an example embodiment. FIG. 2 is a conceptual diagram illustrating complex pixels. FIG. 3 is a conceptual diagram illustrating complex pixels. FIG. 4 is a conceptual diagram illustrating sub-complex pixels.

Referring to FIG. 1, the complex light modulator 100 may modulate the amplitude and phase of light. The complex light modulator 100 may include an amplitude modulator 110, a processor 120, and a phase modulator 130. The amplitude modulator 110 may adjust the amplitude of light. The amplitude modulator 110 may include a spatial light modulator. For example, the amplitude modulator 110 may include a liquid crystal device (LCD), a semiconductor modulator, a digital micromirror device (DMD), or a liquid crystal on silicon (LCoS). The amplitude modulator 110 may be connected to the processor 120 by wire or wirelessly. The amplitude modulator 110 may receive a hologram data signal, for example, a computer generated hologram (CGH) data signal, from the processor 120. The amplitude modulator 110 may control the amplitude of light according to the hologram data signal from the processor 120. Although the amplitude modulator 110 is shown to include a transmissive spatial light modulator, embodiments are not limited thereto. For example, the amplitude modulator 110 may include a reflective spatial light modulator.

The phase modulator 130 may modulate the phase of light. The phase modulator 130 may include a phase plate or a spatial light modulator. For example, the phase modulator 130 may include an LCD, a semiconductor modulator, a DMD, or an LCoS. When the phase modulator 130 includes a phase plate, the phase modulator 130 may include patterns for delaying the phase of light by increasing an optical distance of light passing through the phase modulator 130. For example, the phase modulator 130 may include patterns having different thicknesses.

Referring to FIGS. 2 and 3, the complex light modulator 100 may have complex pixels 101 arranged in two dimensions. For example, the center points of the complex pixels 101 may be disposed at intersections between a plurality of rows arranged in parallel in a horizontal direction and a plurality of columns arranged in parallel in a vertical direction. The arrangement of the complex pixels 101 shown in FIG. 2 may be included in the complex light modulator 100 according to the example embodiment. FIG. 3 illustrates that the center points of the complex pixels 101 are respectively disposed at intersections between a plurality of rows and a plurality of columns. The complex pixels 101 may be pixels constituting a complex wave field for generating a holographic image. As an example, complex pixels arranged in a 3×3 format among the complex pixels 101 are illustrated in FIG. 2. Hereinafter, a position (m,n) refers to a position where an m-th column and an n-th row intersect each other.

Each of the complex pixels 101 may have complex light modulation characteristics. The complex light modulation characteristics may be characteristics for modulating the phase and amplitude of light. The phase modulation characteristics of the complex pixels 101 may be defined by the phase modulator 130, and the amplitude modulation characteristics may be defined by the amplitude modulator 110. The complex light modulation characteristics of the complex pixels 101 may be expressed by a phasor. Herein, a phasor representing the complex light modulation characteristics of the complex pixels 101 is referred to as a modulation phasor. The modulation phasor may be denoted as follows.

A modulation phasor of a complex pixel placed at the position (m,n) is represented by Equation 1, as follows:

$$A_{(m,n)}e^{j\theta_{(m,n)}} \quad \text{[Equation 1]}$$

Here, $A_{(m,n)}$ is the amplitude of the complex pixel placed at the position (m,n), and $\theta_{(m,n)}$ is the phase of the complex pixel placed at the position (m,n).

The complex light modulator 100 may generate a holographic pattern by using a method based on Burckhardt encoding. Herein, the hologram pattern may be a pattern formed by the complex pixels 101.

Referring to FIG. 4, each of the complex pixels 101 may include nine sub-complex pixels 102 arranged in a 3×3 format. For example, sub-complex pixels 102 for one complex pixel 101 are illustrated in FIG. 4. Each of the sub-complex pixels 102 may have complex light modulation characteristics. The phase modulation characteristics of the sub-complex pixels 102 may be defined by the phase modulator 130, and the amplitude modulation characteristics of the sub-complex pixels 102 may be defined by the amplitude modulator 110. The light modulation characteristics of the sub-complex pixels 102 may be expressed by sub-phasors, respectively. The sub-phasors may be parallel to three-phase unit phasors. For example, the unit phasors may be $$e^{j0\pi}, e^{j\frac{2}{3}\pi}, \text{ and } e^{j\frac{4}{3}\pi}.$$

The sum of the sub-phasors may be equal to the modulation phasor. For example, the modulation phasor may be decomposed into the sub-phasors. Accordingly, the complex light modulation characteristics of the complex pixel 101 may be implemented by the sub-complex pixels 102. A relation between the modulation phasor and the sum of the sub-phasors may be expressed in Equation 2, as follows:

$$A_{(m,n)} e^{j\theta|m,n|} = A1_{(m,n)} e^{j0\pi} + A2_{(m,n)} e^{j\frac{2}{3}\pi} + A3_{(m,n)} e^{j\frac{4}{3}\pi} \quad \text{[Equation 2]}$$

Here, $A_{(m,n)}$ is the amplitude of a complex pixel disposed at the position (m,n), $\theta_{(m,n)}$ is the phase of the complex pixel disposed at the position (m,n), $A1_{(m,n)}$ is the sum of the amplitudes of sub-complex pixels each having a phase of 0°, $A2_{(m,n)}$ is the sum of the amplitudes of sub-complex pixels each having a phase of 120°, and $A3_{(m,n)}$ is the sum of the amplitudes of sub-complex pixels each having a phase of 240°.

As illustrated in FIG. 2, complex pixels 101 adjacent to each other may share some of the sub-complex pixels 102. Herein, a combination of complex pixels sharing the sub-complex pixels 102 is referred to as a covalently coupled complex pixel group, and a combination of complex pixels not sharing the sub-complex pixels 102 is referred to as a non-coupled complex pixel group. The covalently coupled complex pixel group may be generated based on the non-coupled complex pixel group. Hereinafter, a method of generating a covalently coupled complex pixel group will be described.

Figure 5:
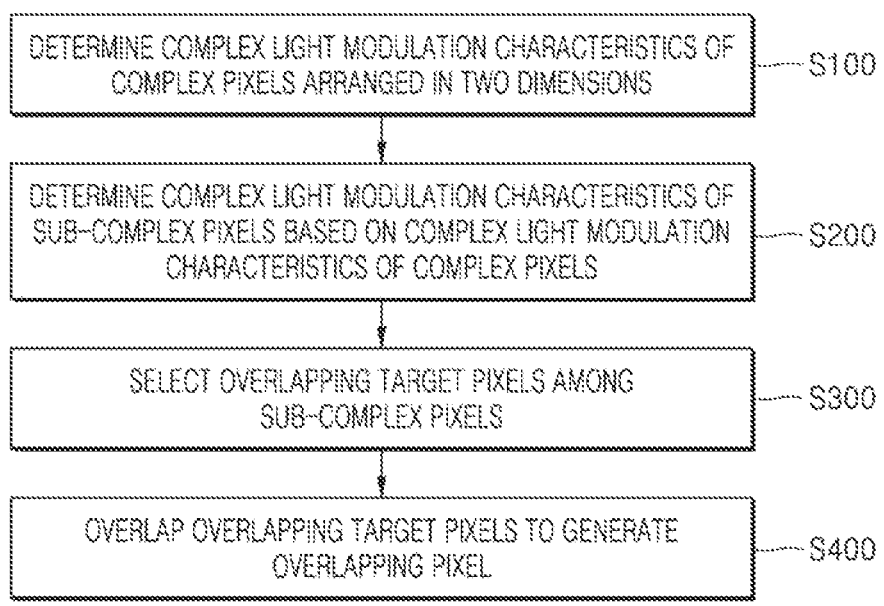
FIG. 5 is a flowchart illustrating a method of generating a covalently coupled complex pixel group.
Figure 6:
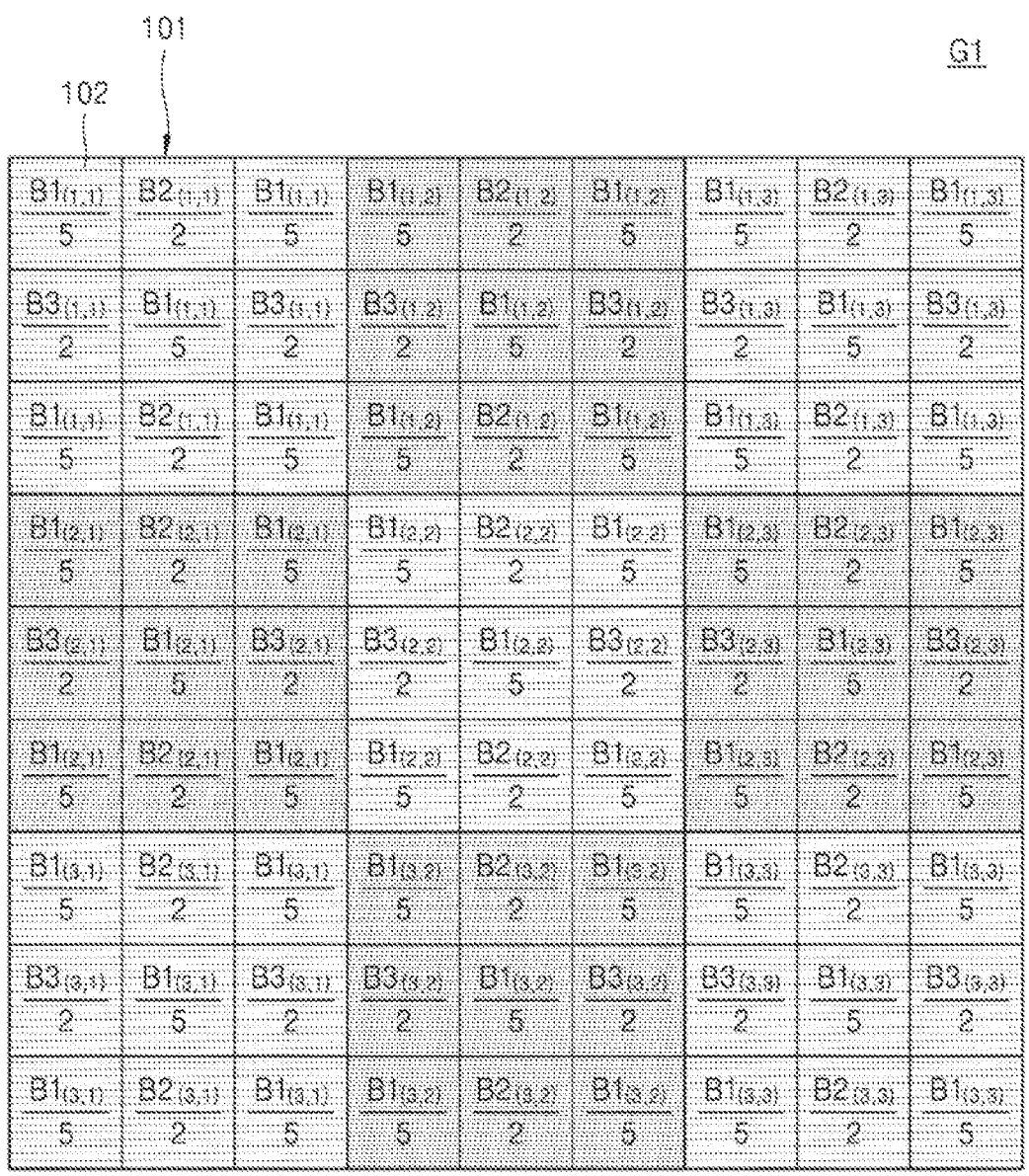
FIG. 6 is a conceptual diagram illustrating a non-coupled complex pixel group.
Figure 7:
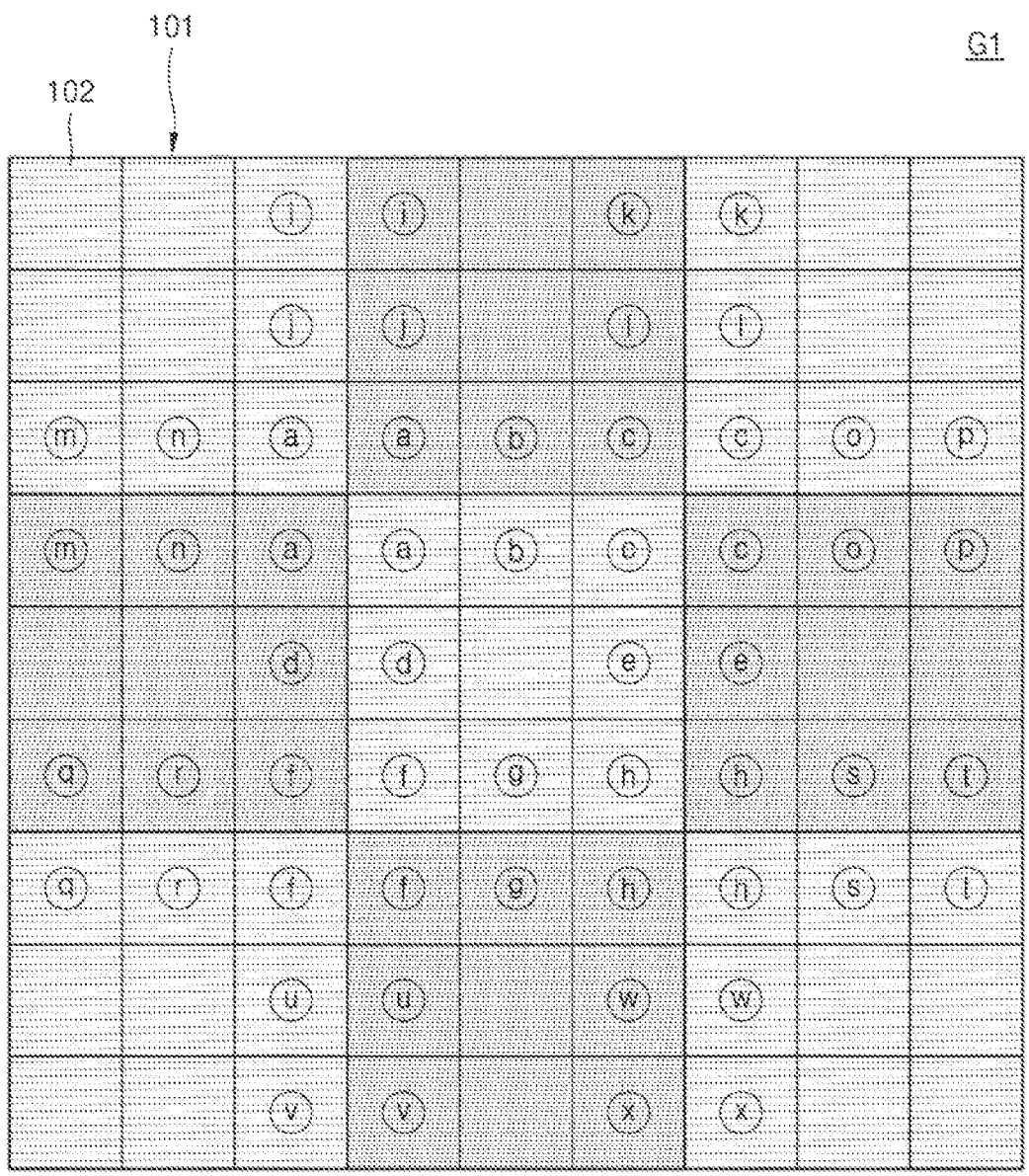
FIG. 7 is a conceptual diagram illustrating a non-coupled complex pixel group.
Figure 8:
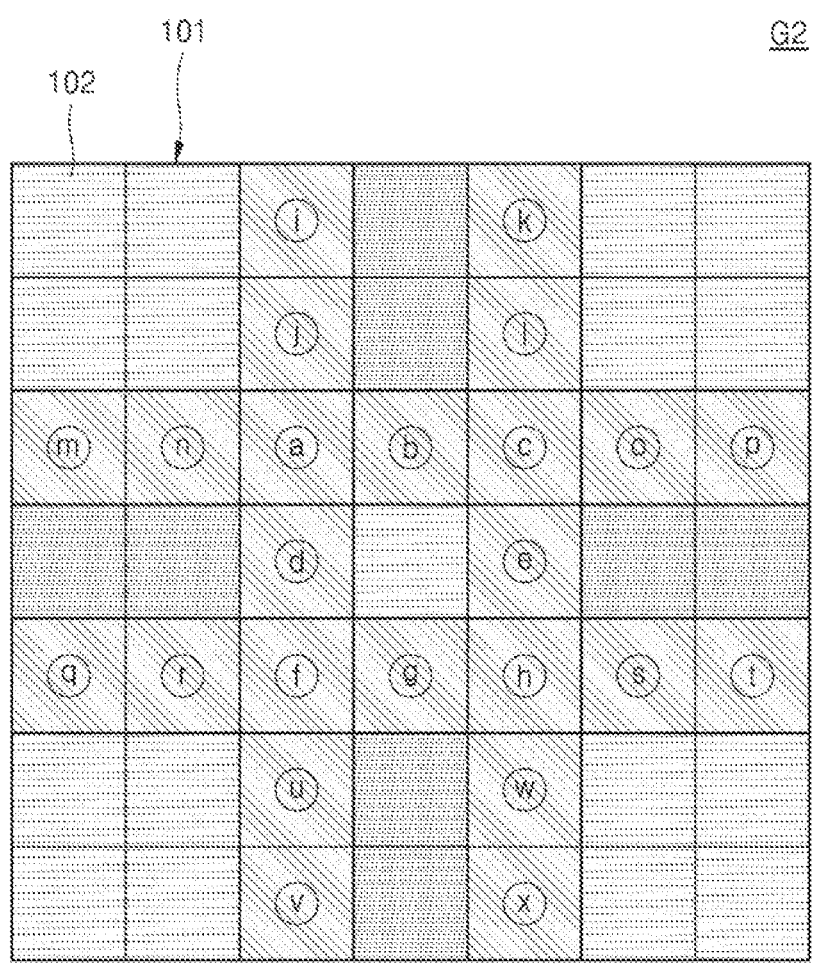
FIG. 8 is a conceptual diagram illustrating a covalently coupled complex pixel group.

FIG. 5 is a flowchart illustrating a method of generating a covalently coupled complex pixel group. FIG. 6 is a conceptual diagram illustrating a non-coupled complex pixel group. FIG. 7 is a conceptual diagram illustrating a non-coupled complex pixel group. FIG. 8 is a conceptual diagram illustrating a covalently coupled complex pixel group. For example, a covalently coupled complex pixel group and a non-coupled complex pixel group, which have complex pixels arranged in a 3×3 format, will be described.

Referring to FIGS. 5 and 6, a non-coupled complex pixel group G1 may be generated. The complex light modulation characteristics of the complex pixels 101 arranged in two dimensions may be determined (S100). The complex pixels 101 respectively disposed at positions (1,1), (1,2), (1,3), (2,1), (2,2), (2,3), (3,1), (3,2), and (3,3) are referred to as a (1,1) complex pixel, a (1,2) complex pixel, a (1,3) complex pixel, a (2,1) complex pixel, a (2,2) complex pixel, a (2,3) complex pixel, a (3,1) complex pixel, a (3,2) complex pixel, and a (3,3) complex pixel, respectively. The complex light modulation characteristics of the (1,1) to (3,3) complex pixels may be expressed by modulation phasors, respectively. Modulation phasors or the complex light modulation characteristics of the complex pixels 101 may be determined based on amplitude information and phase information of a holographic image allocated to each of the complex pixels 101 according to the resolution of the complex light modulator 100 including a covalently coupled complex pixel group G2.

Each of the (1,1) to (3,3) complex pixels may include sub-complex pixels 102 arranged in a 3×3 format. For each of the (1,1) to (3,3) complex pixels, the sub-complex pixels 102 respectively disposed at the positions (1,1), (1,2), (1,3), (2,1), (2,2), (2,3), (3,1), (3,2), and (3,3) are referred to as a (1,1) sub-complex pixel, a (1,2) sub-complex pixel, a (1,3) sub-complex pixel, a (2,1) sub-complex pixel, a (2,2) sub-complex pixel, a (2,3) sub-complex pixel, a (3,1) sub-complex pixel, a (3,2) sub-complex pixel, and a (3,3) sub-complex pixel, respectively.

The complex light modulation characteristics of the (1,1) to (3,3) complex pixels may be implemented by corresponding (1,1) to (3,3) sub-complex pixels. Based on the complex light modulation characteristics of the (1,1) to (3,3) complex pixels, the complex light modulation characteristics of the (1,1) to (3,3) sub-complex pixels may be determined (S200). For example, based on modulation phasors of the (1,1) to (3,3) complex pixels, sub-phasors of the (1,1) to (3,3) sub-complex pixels of the (1,1) to (3,3) complex pixels may be calculated. The sub-phasors may be parallel to three-phase unit phasors. For example, the unit phasors may be $$e^{j0\pi}, e^{j\frac{2}{3}\pi}, \text{ and } e^{j\frac{4}{3}\pi}.$$

The sum of the sub-phasors may be equal to the modulation phasor. For example, the modulation phasor may be decomposed into the sub-phasors. A relation between the modulation phasor of each of the (1,1) to (3,3) complex pixels and the sum of the sub-phasors of the (1,1) to (3,3) sub-complex pixels may be expressed in Equation 3, as follows:

$$B_{(m,n)} e^{j\theta|m,n|} = B1_{(m,n)} e^{j0\pi} + B2_{(m,n)} e^{j\frac{2}{3}\pi} + B3_{(m,n)} e^{j\frac{4}{3}\pi} \quad \text{[Equation 3]}$$

Here, $B_{(m,n)}$ is the amplitude of a complex pixel disposed at the position (m,n), $\theta_{(m,n)}$ is the phase of the complex pixel disposed at the position (m,n), $B1_{(m,n)}$ is the sum of the amplitudes of sub-complex pixels each having a phase of 0°, $B2_{(m,n)}$ is the sum of the amplitudes of sub-complex pixels each having a phase of 120°, and $B3_{(m,n)}$ is the sum of the amplitudes of sub-complex pixels each having a phase of 240°.

The sub-phasors of the (1,1) to (3,3) sub-complex pixels of the complex pixel 101 disposed at the position (m,n) may be determined such that the phases and amplitudes thereof form point symmetry. The (1,1), (3,3), (1,3), (3,1), and (2,2)

sub-complex pixels may each have a first phase and a first amplitude. For example, the first phase may be 0°, and the first amplitude may be $$\frac{B1_{(m,n)}}{5}.$$

The (1,2) and (3,2) sub-complex pixels may each have a second phase and a second amplitude. For example, the second phase may be 120°, and the second amplitude may be $$\frac{B2_{(m,n)}}{2}.$$

The (2,1) and (2,3) sub-complex pixels may each have a third phase and a third amplitude. For example, the third phase may be 240°, and the third amplitude may be $$\frac{B3_{(m,n)}}{2}.$$

The phasors shown in the sub-complex pixels 102 in FIG. 6 may be sub-phasors of corresponding sub-complex pixels 102, respectively. When the phases and amplitudes of the (1,1) to (3,3) sub-complex pixels form point symmetry, the noise, for example, conjugate noise or zero order noise, of a hologram output from the complex light modulator 100 may be reduced or eliminated.

Referring to FIGS. 5 and 7, overlapping target pixels ⓐ to ⓧ among the sub-complex pixels 102 may be selected (S300). The sub-complex pixels 102 indicated by reference numerals ⓐ to ⓧ in FIG. 7 are referred to as overlapping target pixels ⓐ to ⓧ, respectively. Overlapping target pixels ⓐ to ⓧ having the same reference numeral may be sub-complex pixels 102 that are disposed on different complex pixels 101, have the same phase, and are immediately adjacent to each other. The overlapping target pixels ⓐ to ⓧ having the same reference numeral may overlap one another when the covalently coupled complex pixel group G2 is formed. For example, operation S300 of selecting overlapping target pixels ⓐ to ⓧ among the sub-complex pixels 102 may be performed by focusing on the (2,2) complex pixel of FIG. 7.

The (1,1) sub-complex pixel of the (2,2) complex pixel, the (3,3) sub-complex pixel of the (1,1) complex pixel, the (3,1) sub-complex pixel of the (1,2) complex pixel, and the (1,3) sub-complex pixel of the (2,1) complex pixel may be the overlapping target pixels ⓐ that are immediately adjacent to each other and have a phase of 0°.

The (1,2) sub-complex pixel of the (2,2) complex pixel and the (3,2) sub-complex pixel of the (1,2) complex pixel may be the overlapping target pixels) that are immediately adjacent to each other and have a phase of 120°.

The (1,3) sub-complex pixel of the (2,2) complex pixel, the (3,3) sub-complex pixel of the (1,2) complex pixel, the (3,1) sub-complex pixel of the (1,3) complex pixel, and the (1,1) sub-complex pixel of the (2,3) complex pixel may be the overlapping target pixels ⓒ that are immediately adjacent to each other and have a phase of 0°.

The (2,1) sub-complex pixel of the (2,2) complex pixel and the (2,3) sub-complex pixel of the (2,1) complex pixel may be the overlapping target pixels ⓓ that are immediately adjacent to each other and have a phase of 240°.

The (2,3) sub-complex pixel of the (2,2) complex pixel and the (2,1) sub-complex pixel of the (2,3) complex pixel may be the overlapping target pixels ⓔ that are immediately adjacent to each other and have a phase of 240°.

The (3,1) sub-complex pixel of the (2,2) complex pixel, the (3,3) sub-complex pixel of the (2,1) complex pixel, the (1,3) sub-complex pixel of the (3,1) complex pixel, and the (1,1) sub-complex pixel of the (3,2) complex pixel may be the overlapping target pixels (ⓕ) that are immediately adjacent to each other and have a phase of 0°.

The (3,2) sub-complex pixel of the (2,2) complex pixel and the (1,2) sub-complex pixel of the (3,2) complex pixel may be the overlapping target pixels ⓖ that are immediately adjacent to each other and have a phase of 120°.

The (3,3) sub-complex pixel of the (2,2) complex pixel, the (3,1) sub-complex pixel of the (2,3) complex pixel, the (1,3) sub-complex pixel of the (3,2) complex pixel, and the (1,1) sub-complex pixel of the (3,3) complex pixel may be the overlapping target pixels ⓗ that are immediately adjacent to each other and have a phase of 0°.

The overlapping target pixels ⓘ to ⓧ may also be selected in the same manner as the overlapping target pixels ⓐ to ⓗ.

Referring to FIGS. 5 and 8, the overlapping target pixels ⓐ to ⓧ in FIG. 7 may overlap one another and thus generate a covalently coupled complex pixel group G2. The overlapping target pixels ⓐ to ⓧ in FIG. 7 may overlap one another to generate overlapping pixels ⓐ to ⓧ in FIG. 8. Overlapping target pixels having the same reference numeral may overlap one another to generate one overlapping pixel. The overlapping pixel may have the same reference numeral as the overlapping target pixels that generate the overlapping pixel. For example, the overlapping target pixels ⓐ of FIG. 7 may overlap one another to generate the overlapping pixel ⓐ in FIG. 8. The overlapping pixels ⓐ to ⓧ may be some of the sub-complex pixels 102 constituting the complex pixels 101.

The complex light modulation characteristics of each of the overlapping pixels ⓐ to ⓧ may be expressed as the sum of the sub-phasors of sub-complex pixels, for example, the overlapping target pixels ⓐ to ⓧ in FIG. 7, that generate each of the overlapping pixels ⓐ to ⓧ. The phase of each of the overlapping pixels ⓐ to ⓧ may be the same as the phases of the overlapping target pixels ⓐ to ⓧ in FIG. 7, which generate each of the overlapping pixels ⓐ to ⓧ. The amplitude of each of the overlapping pixels ⓐ to ⓧ may be equal to the sum of the amplitudes of the overlapping target pixels ⓐ to ⓧ in FIG. 7, which generate each of the overlapping pixels ⓐ to ⓧ. Complex pixels 101 including overlapping target pixels that generate one overlapping pixel may share the one overlapping pixel. In other words, the one overlapping pixel may be one of the sub-complex pixels 102 arranged in a 3×3 format, which constitute a complex pixel 101 including each of the overlapping target pixels that generate the one overlapping pixel. Hereinafter, operation S400 will be described by focusing on the (2,2) complex pixel.

The (1,1) sub-complex pixel of the (2,2) complex pixel, the (3,3) sub-complex pixel of the (1,1) complex pixel, the (3,1) sub-complex pixel of the (1,2) complex pixel, and the (1,3) sub-complex pixel of the (2,1) complex pixel may overlap one another to generate the overlapping pixel ⓐ. The phase of the overlapping pixel ⓐ may be 0°. The amplitude of the overlapping pixel ⓐ may be $$\frac{B1_{(1,1)}}{5} + \frac{B1_{(1,2)}}{5} + \frac{B1_{(2,1)}}{5} + \frac{B1_{(2,2)}}{5}.$$

The (2,2) complex pixel, the (1,1) complex pixel, the (1,2) complex pixel, and the (2,1) complex pixel may share the overlapping pixel ⓐ.

The (1,2) sub-complex pixel of the (2,2) complex pixel and the (3,2) sub-complex pixel of the (1,2) complex pixel may overlap each other to generate the overlapping pixel ⓑ. The phase of the overlapping pixel ⓑ may be 120°. The amplitude of the overlapping pixel ⓑ may be $$\frac{B2_{(1,2)}}{2} + \frac{B2_{(2,2)}}{2}.$$

The (2,2) complex pixel and the (1,2) complex pixel may share the overlapping pixel ⓑ.

The (1,3) sub-complex pixel of the (2,2) complex pixel, the (3,3) sub-complex pixel of the (1,2) complex pixel, the (3,1) sub-complex pixel of the (1,3) complex pixel, and the (1,1) sub-complex pixel of the (2,3) complex pixel may overlap one another to generate the overlapping pixel ⓐ. The phase of the overlapping pixel ⓒ may be 0°. The amplitude of the overlapping pixel ⓒ may be $$\frac{B1_{(1,2)}}{5} + \frac{B1_{(1,3)}}{5} + \frac{B1_{(2,2)}}{5} + \frac{B1_{(2,3)}}{5}.$$

The (2,2) complex pixel, the (1,2) complex pixel, the (1,3) complex pixel, and the (2,3) complex pixel may share the overlapping pixel ⓒ.

The (2,1) sub-complex pixel of the (2,2) complex pixel and the (2,3) sub-complex pixel of the (2,1) complex pixel may overlap each other to generate the overlapping pixel ⓓ. The phase of the overlapping pixel ⓓ may be 240°. The amplitude of the overlapping pixel ⓓ may be $$\frac{B3_{(2,1)}}{2} + \frac{B3_{(2,2)}}{2}.$$

The (2,2) complex pixel and the (2,1) complex pixel may share the overlapping pixel ⓓ.

The (2,3) sub-complex pixel of the (2,2) complex pixel and the (2,1) sub-complex pixel of the (2,3) complex pixel may overlap each other to generate the overlapping pixel ⓔ. The phase of the overlapping pixel ⓔ may be 240°. The amplitude of the overlapping pixel ⓔ may be $$\frac{B3_{(2,2)}}{2} + \frac{B3_{(2,3)}}{2}.$$

The (2,2) complex pixel and the (2,3) complex pixel may share the overlapping pixel ⓔ.

The (3,1) sub-complex pixel of the (2,2) complex pixel, the (3,3) sub-complex pixel of the (2,1) complex pixel, the (1,3) sub-complex pixel of the (3,1) complex pixel, and the (1,1) sub-complex pixel of the (3,2) complex pixel may overlap one another to generate the overlapping pixels). The phase of the overlapping pixel ⓕ may be 0°. The amplitude of the overlapping pixel ⓕ may be $$\frac{B1_{(2,1)}}{5} + \frac{B1_{(2,2)}}{5} + \frac{B1_{(3,1)}}{5} + \frac{B1_{(3,2)}}{5}.$$

The (2,2) complex pixel, the (2,1) complex pixel, the (3,1) complex pixel, and the (3,2) complex pixel may share the overlapping pixel ⓕ.

The (3,2) sub-complex pixel of the (2,2) complex pixel and the (1,2) sub-complex pixel of the (3,2) complex pixel may be coupled to each other to generate the overlapping pixel ⓖ. The phase of the overlapping pixel ⓖ may be 120°. The amplitude of the overlapping pixel ⓖ may be $$\frac{B2_{(2,2)}}{2} + \frac{B2_{(3,2)}}{2}.$$

The (2,2) complex pixel and the (3,2) complex pixel may share the overlapping pixel ⓖ.

The (3,3) sub-complex pixel of the (2,2) complex pixel, the (3,1) sub-complex pixel of the (2,3) complex pixel, the (1,3) sub-complex pixel of the (3,2) complex pixel, and the (1,1) sub-complex pixel of the (3,3) complex pixel may overlap one another to generate the overlapping pixel ⓗ. The phase of the overlapping pixel ⓗ may be 0°. The amplitude of the overlapping pixel ⓗ may be $$\frac{B1_{(2,2)}}{5} + \frac{B1_{(2,3)}}{5} + \frac{B1_{(3,2)}}{5} + \frac{B1_{(3,3)}}{5}.$$

The (2,2) complex pixel, the (2,3) complex pixel, the (3,2) complex pixel, and the (3,3) complex pixel may share the overlapping pixel ⓗ.

In the above-described way, the overlapping pixels ⓘ to ⓧ may be generated. The (1,1) and (1,2) complex pixels may further share the overlapping pixels ⓘ and ⓙ. The (1,2) and (1,3) complex pixels may further share the overlapping pixels ⓚ and ⓛ. The (1,1) and (2,1) complex pixels may further share the overlapping pixels ⓜ and ⓝ. The (1,3) and (2,3) complex pixels may further share the overlapping pixels ⓞ and ⓟ. The (2,1) and (3,1) complex pixels may further share the overlapping pixels ⓠ and ⓡ. The (2,3) and (3,3) complex pixels may further share the overlapping pixels ⓢ and ⓣ. The (3,1) and (3,2) complex pixels may further share the overlapping pixels ⓥ and ⓤ. The (3,2) and (3,3) complex pixels may further share the overlapping pixels ⓦ and ⓧ.

In the complex light modulator 100 according to the present example embodiment, each of the complex pixels 101 has sub-complex pixels 102 arranged in a 3×3 format, but substantially the same effect as when the amplitudes and phases of the sub-complex pixels 102 form point symmetry may be obtained. For example, conjugate noise or zero-order noise in the complex light modulator 100 may be reduced or may not be substantially generated.

The resolution of the complex light modulator 100 may be determined by the density of the complex pixels 101. In the case of the non-coupled complex pixel group G1, each of the complex pixels 101 may include sub-complex pixels 102 that are not shared and are arranged in a 3×3 format. For example, 3·m×3·n sub-complex pixels 102 are required to define the complex pixels 101 arranged in a m×n format.

In the case of the complex light modulator 100 according to the present example embodiment, which includes the covalently coupled complex pixel group G2, the complex pixels 101 each include sub-complex pixels 102 arranged in a 3×3 format, but may share some sub-complex pixels, for example, the overlapping pixels (a) to (x). For example, the complex pixels 101 arranged in a m ×n format may be defined by (3· m−(m−1))×(3· n−(n−1)) sub-complex pixels 102, that is, (2· m+1)×(2· n+1) sub-complex pixels 102.

When the area of a display area, for example, an area in which the complex pixels 101 are arranged, of a complex light modulator including the non-coupled complex pixel group G1 is the same as an area of a display area of the complex light modulator 100 according to the example embodiment, which includes the covalently coupled complex pixel group G2, the complex light modulator 100 according to the present example embodiment may include more complex pixels 101 than the complex light modulator including the non-coupled complex pixel group G1. Accordingly, the resolution of the complex light modulator 100 according to the present example embodiment may be higher than a resolution of the complex light modulator including the non-coupled complex pixel group G1.

Figure 9:
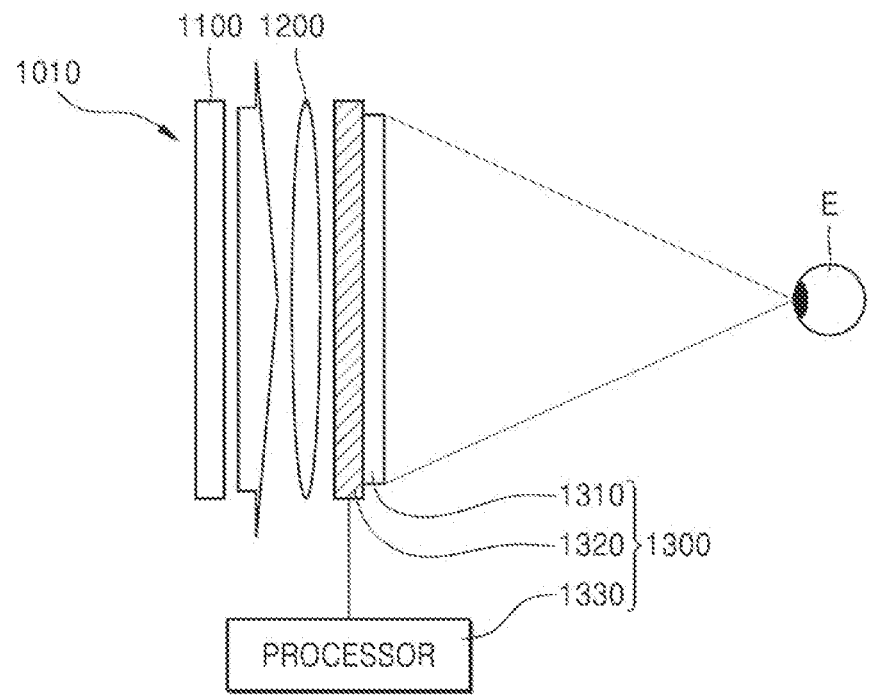
FIG. 9 is a conceptual diagram illustrating a holographic display apparatus according to an example embodiment.

FIG. 9 is a conceptual diagram illustrating a holographic display apparatus 1010 according to an example embodiment. For brevity of description, descriptions substantially the same as those given above with reference to FIGS. 1 to 8 may be omitted.

Referring to FIG. 9, the holographic display apparatus 1010 may be provided. The holographic display apparatus 1010 may include a backlight unit 1100, a Fourier lens 1200, and a complex light modulator 1300. The complex light modulator 1300 may include a phase modulator 1310, an amplitude modulator 1320, and a processor 1330. The complex light modulator 1300 may be substantially the same as the complex light modulator 100 described with reference to FIGS. 1 to 8.

The backlight unit 1100 may emit coherent light. For example, the backlight unit 1100 may include a laser diode to provide light having high coherence. In addition to the laser diode, the backlight unit 1100 may include any other light source as long as it emits light having spatial coherence. Furthermore, the backlight unit 1100 may further include an optical system that expands light emitted from the laser diode to generate collimated parallel light having a uniform intensity distribution. Accordingly, the backlight unit 1100 may provide parallel coherent light having a spatially uniform intensity distribution to the entire area of the complex light modulator 1300.

The Fourier lens 1200 may focus a holographic image or an image on a space. For example, a holographic image may be reproduced on a focal plane of the Fourier lens 1200, and a user's eye E may be disposed on the focal plane to view the holographic image. Although the Fourier lens 1200 is illustrated to be disposed on a light incident surface of the complex light modulator 1300, that is, between the backlight unit 1100 and the complex light modulator 1300, the position of the Fourier lens 1200 is not limited to thereto. For example, the Fourier lens 1200 may be disposed on a light exit surface of the complex light modulator 1300.

The resolution of the holographic display apparatus 1010 may be determined by the resolution of the complex light modulator 1300. Because the complex light modulator 1300 has a high resolution, the resolution characteristics of the holographic display apparatus 1010 according to the example embodiment may be improved. In addition, the holographic display apparatus 1010 according to the present example embodiment may have a wide viewing window.

Hereinafter, a viewing window of the holographic display apparatus 1010 according to the present example embodiment will be described.

Figure 10:
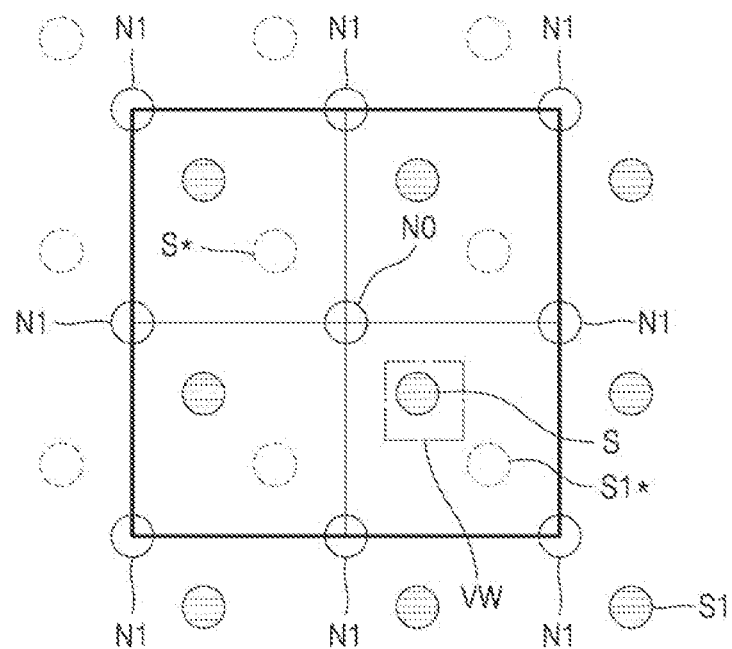
FIG. 10 illustrates a distribution of light formed on a focal plane of a Fourier lens in FIG. 9 when only a spatial amplitude light modulator is used without phase modulation, or when the phases and amplitudes of sub-complex pixels do not form point symmetry.

FIG. 10 illustrates the distribution of light formed on the focal plane of the Fourier lens 1200 in FIG. 9 when complex modulation is not used and only a spatial amplitude light modulator is used without phase modulation (existing amplitude hologram), or when the phases and amplitudes of sub-complex pixels do not form point symmetry.

Referring to FIG. 10, zero-order noise NO may be formed on the center of the focal plane of the Fourier lens 1200, that is, on an optical axis of the Fourier lens 1200. The zero-order noise NO may be generated as part of the light incident on the amplitude modulator 1320 including a spatial light modulator that is not diffracted and passes through the amplitude modulator 1320 as it is.

High-order noises N1 that are generated by high-order diffraction around the zero-order noise NO are regularly formed in a grating form. The high-order noises N1 may occur due to interference of light diffracted by a regular pixel structure and/or wiring structure of the amplitude modulator 1320, and is not a hologram pattern.

Because the zero-order and high-order noises N0 and N1 are generated by a laser light source coherent with a physical internal structure of the amplitude modulator 1320 and are not related to a hologram pattern displayed by the amplitude modulator 1320, the positions of the zero-order and high-order noises N0 and N1 may be fixed on the focal plane of the Fourier lens 1200.

The position of a holographic image S may be determined by a hologram pattern defined by the phase modulator 1310 and the amplitude modulator 1320. The hologram pattern may be formed such that the holographic image S is reproduced at a position where the zero-order and high-order noises N0 and N1 are not present. For example, the phase modulator 1310 may display a prism pattern together with a hologram pattern. The prism pattern may be generated by the processor 1330 based on a prism phase added to CGH data including information on the holographic image S. The holographic image S may be reproduced off-axis from the optical axis based on an off-axis method reproduction. Accordingly, the reproduced holographic image S may be located away from the zero-order and high-order noises N0 and N1. The off-axis method reproduction is a method for avoiding the zero-order and high-order noises N0 and N1, and may be used as necessary.

The holographic image S may be located diagonally away from the zero-order noise NO by using an off-axis method. In the case of the off-axis method, a complex conjugate image S* may be generated in the opposite direction to the holographic image S with respect to the zero-order noise NO. The complex conjugate image S* may be referred to as conjugate noise. Holographic images S1 due to high-order diffraction and complex conjugate images S1* thereof may be generated in a diagonal direction around the high-order noise N1.

A viewing window VW may be an area in which the holographic image S may be located. The size of the viewing window VW may be limited by the zero-order and high-order noises N0 and N1, the complex conjugate image S*, the holographic images S1 due to high-order diffraction, and the complex conjugate images S1* thereof.

Figure 11:
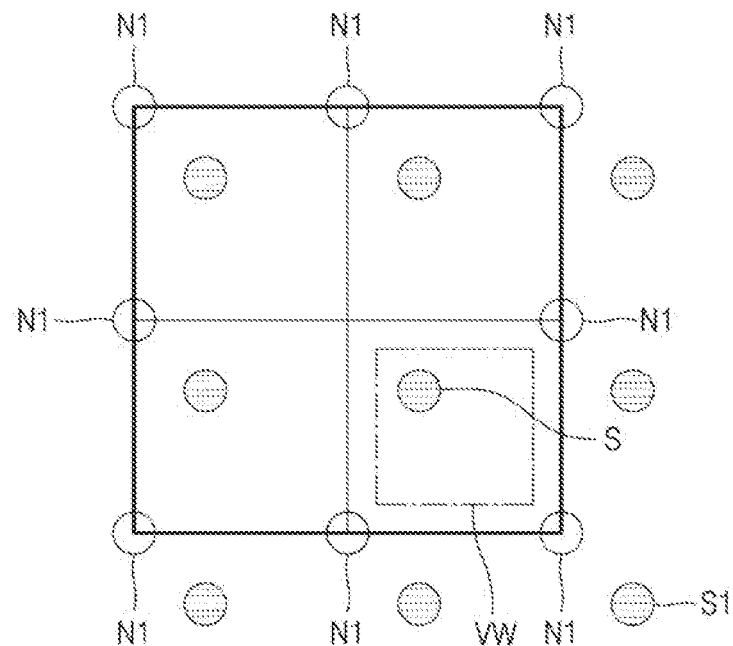
FIG. 11 illustrates a distribution of light formed on a focal plane of a Fourier lens by a holographic display apparatus according to an example embodiment.

FIG. 11 illustrates a distribution of light formed on a focal plane of a Fourier lens by the holographic display apparatus according to the present example embodiment.

In a complex hologram, because a zero-order direct current (DC) is canceled by modulation of three phases (0 degrees, 120 degrees, and 240 degrees) that are structurally point-symmetric at the zero-order, zero-order noise, for example, the zero-order noise NO in FIG. 10, and conjugate noise, for example, the complex conjugate image S* in FIG. 10, may not be generated. Because the conjugate noise, for example, the complex conjugate image S* in FIG. 10, is not generated, conjugate noise, for example, the complex conjugate images S1* in FIG. 10, due to higher-order diffraction may not be generated.

Factors limiting the size of the viewing window VW may be reduced, and thus, the viewing window VW may be expanded. Accordingly, example embodiments may provide a holographic display apparatus 1010 having a wide viewing window.

Figure 12:
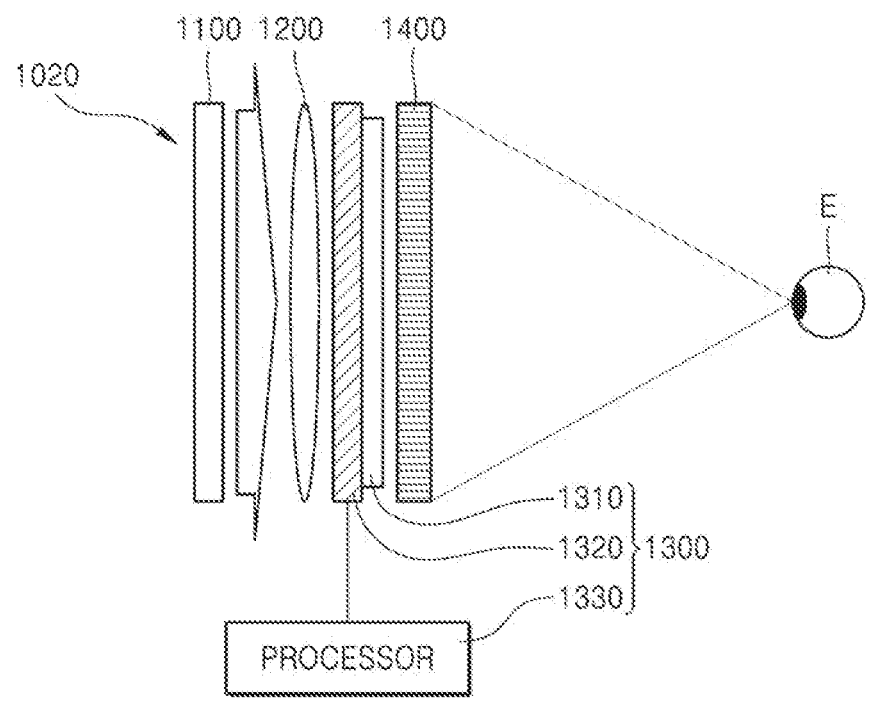
FIG. 12 is a conceptual diagram illustrating a holographic display apparatus according to an example embodiment.
Figure 13:
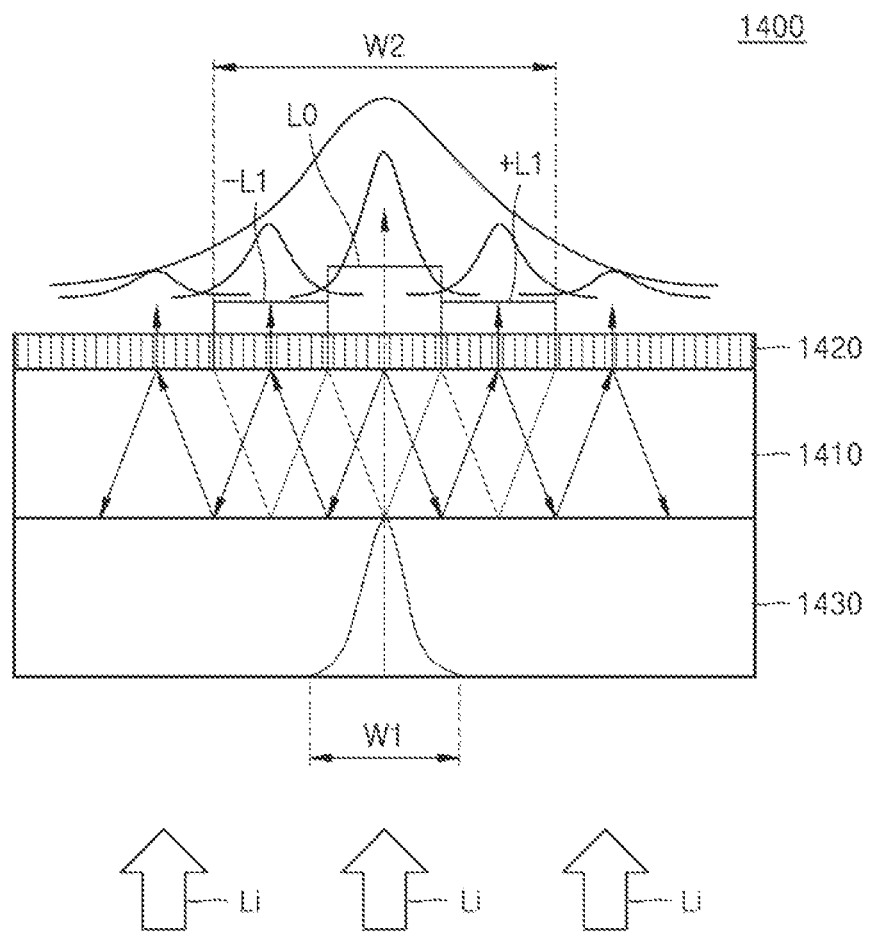
FIG. 13 is a conceptual diagram illustrating a diffraction prevention film in FIG. 12.

FIG. 12 is a conceptual diagram illustrating a holographic display apparatus 1020 according to an example embodiment. FIG. 13 is a conceptual diagram illustrating a diffraction prevention film of FIG. 12. For brevity of description, descriptions substantially the same as those given with reference to FIG. 9 may be omitted.

Referring to FIG. 12, the holographic display apparatus 1020 may further include a diffraction prevention film 1400. The diffraction prevention film 1400 may be disposed to face a light exit surface of a complex light modulator 1300. A plurality of light beams may be provided to the diffraction prevention film 1400. The plurality of light beams may be respectively emitted from sub-complex pixels of the complex light modulator 1300 described with reference to FIGS. 1 to 8.

Referring to FIG. 13, the diffraction prevention film 1400 may include a light guide layer 1410 and a grating layer 1420. The light guide layer 1410 may be provided between the grating layer 1420 and the complex light modulator 1300. The light guide layer 1410 may be disposed parallel to the light exit surface of the complex light modulator 1300. The grating layer 1420 may be disposed on the upper surface of the light guide layer 1410 disposed opposite the complex light modulator 1300. The diffraction prevention film 1400 may further include a substrate 1430 for supporting the light guide layer 1410 and the grating layer 1420 without bending. The substrate 1430 may be disposed on the lower surface of the light guide layer 1410 opposite to the grating layer 1420. However, when the light guide layer 1410 may be supported without being bent by itself, the substrate 1430 may be omitted. In an example, the light guide layer 1410 may be much thinner than the substrate 1430. For example, the thickness of the substrate 1430 may be about 0.5 mm to about 1 mm, and the thickness of the light guide layer 1410 may be about 1 μm to about 5 μm. The substrate 1430 may include a hard glass or a transparent polymer material, and the light guide layer 1410 may include a transparent material having a higher refractive index than the substrate 1430 in order to transmit light therein.

The grating layer 1420 may emit part of the light, incident on the grating layer 1420 from the light guide layer 1410, in a direction perpendicular to the upper surface of the grating layer 1420, and may reflect the remaining part of the light such that it travels obliquely toward the light guide layer 1410. The grating layer 1420 may include various types of surface gratings or volume gratings. The surface grating may include, for example, a diffractive optical element (DOE) such as a binary phase grating or a blazed grating. In addition, the volume grating may include, for example, a holographic optical element (HOE), a geometric phase grating, a Bragg polarization grating, a holographically formed polymer dispersed liquid crystal (H-PDLC), or the like. The volume grating may include periodic fine patterns of materials having different refractive indices. Depending on the size, height, period, duty ratio, shape, etc. of periodic grating patterns constituting the grating layer 1420, the grating layer 1420 may diffract incident light to cause extinction interference and constructive interference, thereby changing a travelling direction of the incident light.

The grating layer 1420 may output a zero-order diffracted light beam among light beams, vertically or obliquely incident on the lower surface of the grating layer 1420, in a direction parallel to the normal line of the upper surface of the grating layer 1420, and may reflect a 1st-order diffracted light beam among the light beams such that it travels obliquely toward the light guide layer 1410. The light guide layer 1410 may be configured to propagate a light beam, which is input obliquely from the grating layer 1420, along the inside of the light guide layer 1410 through total reflection. Accordingly, the 1st-order diffracted light beam may travel along the inside of the light guide layer 1410 while being totally reflected between the upper surface and the lower surface of the light guide layer 1410. For example, as indicated by an arrow, a +1st-order diffracted light beam may travel in a right direction of the light guide layer 1410, and a −1st-order diffracted light beam may travel in a left direction of the light guide layer 1410. Although the −1st-order diffracted light beam traveling to the left direction and the +1st-order diffracted light beam traveling to the right direction are representatively illustrated, the 1st-order diffracted light beam may actually travel in all radial directions with respect to the incident position of the grating layer 1420.

The 1st-order diffracted light beam that is first order-diffracted by the grating layer 1420 may be totally reflected from the lower surface of the light guide layer 1410 and may be again obliquely incident on the upper surface of the light guide layer 1410. Part of the 1st-order diffracted light beam is totally reflected again from the upper surface of the light guide layer 1410, but another part of the 1st-order diffracted light beam is diffracted by the grating layer 1420 and emitted in a direction parallel to the normal line of the upper surface of the grating layer 1420. Accordingly, a light beam emitted from the grating layer 1420 may include a light beam L0 emitted by zero-order diffraction and a light beam L1 emitted by 1st-order diffraction. Light beams −L1 and +L1 emitted by +1st-order diffraction are representatively illustrated on the left and right of the light beam L0 emitted by the zero-order diffraction, but light beams L1 emitted by the 1st-order diffraction may actually be continuously arranged along the circumference of the light beam L0 emitted by the zero-order diffraction. From a viewpoint in a direction perpendicular to the upper surface of the grating layer 1420, the light beams L1 emitted by the 1st-order diffraction may have a ring shape surrounding the light beam L0 emitted by the zero-order diffraction. To this end, the grating layer 1420 may include a two-dimensional grating film configured to diffract incident light in all directions, however, embodiments are not limited thereto. For example, the grating layer 1420 may be formed by laminating two one-dimensional grating films having directivities orthogonal to each other. In this case, for example, a light beam may be expanded in a horizontal direction by a one-dimensional grating film having a horizontal directivity and the expanded light beam may be emitted, and the light beam may be expanded in a vertical direction by a one-dimensional grating film having a vertical directivity and finally a ring-shaped light beam L1 may be emitted.

The light beam L1 emitted by the 1st-order diffraction may at least partially overlap the light beam L0 emitted by the zero-order diffraction. The degree of overlap between the light beam L1 emitted by the 1st-order diffraction and the light beam L0 emitted by the zero-order diffraction may vary depending on the thickness of the light guide layer 1410. As the thickness of the light guide layer 1410 increases, the interval between the light beam L1 emitted by the 1st-order diffraction and the light beam L0 emitted by the zero-order diffraction may also increase. The maximum thickness of the light guide layer 1410 may be determined such that the boundary of the light beam L1 emitted by the 1st-order diffraction coincides with the boundary of the light beam L0 emitted by the zero-order diffraction.

As described above, each of light beams L1 incident on the diffraction prevention film 1400 from the complex light modulator 1300 may be divided into a light beam L0 and a light beam L1 while passing through the diffraction prevention film 1400, the light beam L0 being emitted by the zero-order diffraction and the light beam L1 being emitted by the 1st-order diffraction. Light beams may be combined to form a single expanded light beam. As a result, the diffraction prevention film 1400 may enlarge a beam diameter of each of the light beams L1 incident on the diffraction prevention film 1400 from the complex light modulator 1300. For example, each of the light beams L1 incident on the diffraction prevention film 1400 from the complex light modulator 1300 may have a first beam diameter W1, and a light beam expanded while passing through the diffraction prevention film 1400 may have a second beam diameter W2 that is greater than the first beam diameter W1. The first beam diameter W1 may be determined by a physical grating structure of a spatial light modulator, for example, the amplitude modulator 1320, included in the complex light modulator 1300. In the case of a grating structure formed by wirings of the spatial light modulator, the first beam diameter W1 may be substantially equal to the distance between the wirings. In the case of a grating structure formed by a black mask separating pixels of the spatial light modulator, the first beam diameter W1 may be substantially equal to the size of an opening defined between black masks.

The second beam diameter W2 of the light beam expanded by the diffraction prevention film 1400 may vary depending on the degree of overlap between the light beam L0 emitted by the zero-order diffraction and the light beam L1 emitted by the 1st-order diffraction. In other words, the second beam diameter W2 of the light beam expanded by the diffraction prevention film 1400 may be determined by the thickness of the light guide layer 1410. For example, the thickness of the light guide layer 1410 may be determined such that the second beam diameter W2 of the light beam expanded by the diffraction prevention film 1400 is greater than a pixel size of the spatial light modulator included in the complex light modulator 1300.

The spatial light modulator may include areas through which light may not be transmitted. For example, areas through which light may not be transmitted may include wirings for driving pixels and areas in which a black mask for separating the pixels is provided. Accordingly, a gap without image information may be present between light beams emitted from the spatial light modulator. The gap between the light beams may increase the intensity of a high-order diffraction pattern. Because the diffraction prevention film 1400 enlarges the beam diameters of light beams, the intensity of the high-order diffraction pattern may decrease and ultimately the high-order diffraction pattern may be removed.

The intensity of the light beam L0 emitted by the zero-order diffraction is greater than the intensity of the light beam L1 emitted by the 1st-order diffraction. Accordingly, a light beam expanded by the diffraction prevention film 1400 may have a distribution in which the intensity of the light beam decreases from the center of the light beam to the periphery thereof, and may have a shape similar to a Gaussian distribution. Due to an expanded light beam having a beam diameter that is greater than the first beam diameter W1 and a distribution in which the intensity of the expanded light beam decreases from the center of the expanded light beam to the periphery thereof, high-order noise, for example, the high-order noise N1 of FIG. 10, generated at the focal plane of the Fourier lens 1200 by the spatial light modulator, and holographic images, for example, the holographic images S1 of FIG. 10, generated by the high-order noise may be reduced or may not be generated. That is, factors limiting the size of a viewing window may be reduced. Accordingly, the viewing window may be enlarged.

Figure 14:
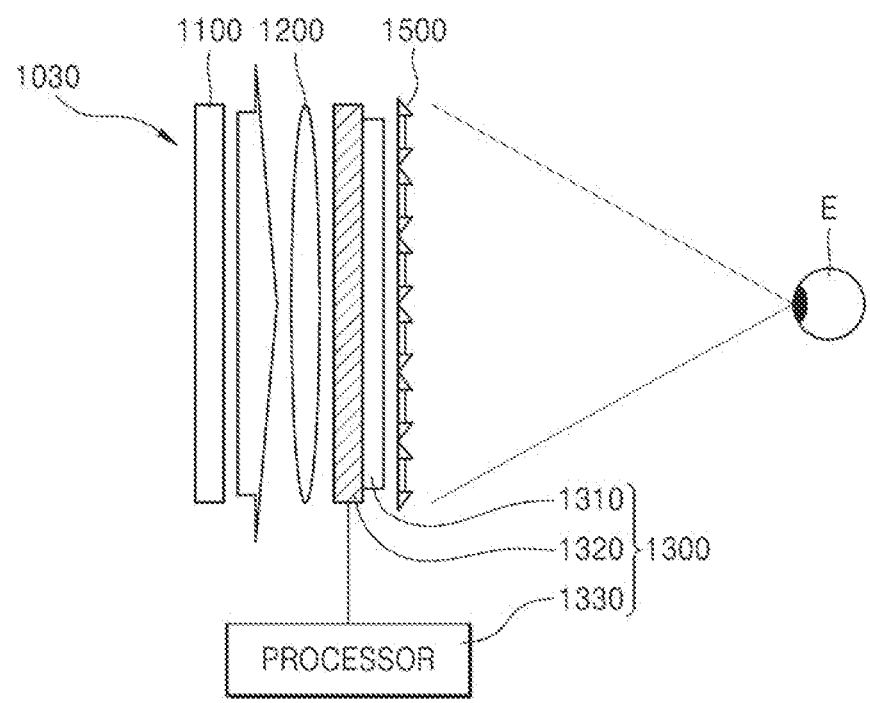
FIG. 14 is a conceptual diagram of a holographic display apparatus according to an example embodiment.
Figure 15:
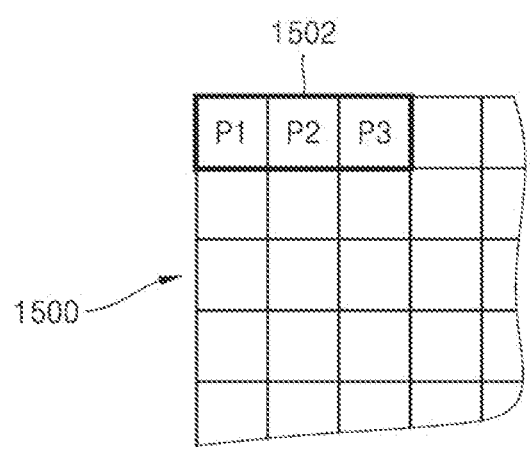
FIG. 15 is a diagram illustrating a prism array in FIG. 14.
Figure 16:
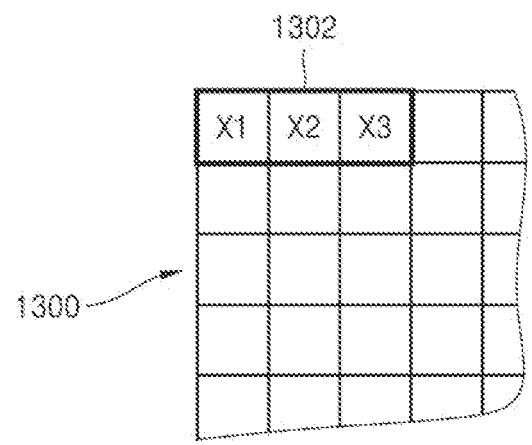
FIG. 16 is a diagram illustrating complex pixels of a complex light modulator in FIG. 14.

FIG. 14 is a conceptual diagram of a holographic display 1030 apparatus according to an example embodiment. FIG. 15 is a diagram illustrating a prism array in FIG. 14. FIG. 16 is a diagram illustrating complex pixels of a complex light modulator in FIG. 14. For brevity of description, descriptions substantially the same as those given above with reference to FIG. 9 may be omitted.

Referring to FIG. 14, the holographic display apparatus 1030 may be provided. The holographic display apparatus 1030 may further include a prism array 1500. The prism array 1500 may be disposed on a light exit surface of a complex light modulator 1300. The prism array 1500 may include a plurality of prisms that allow light to travel in different directions.

Referring to FIG. 15, the prism array 1500 may be divided into a plurality of unit regions 1502 arranged in two dimensions. Each of the unit regions 1502 may include a plurality of prisms P1, P2, and P3 that allow light to travel in different directions. Accordingly, the prism array 1500 may include the plurality of prisms P1, P2, and P3 that are repeatedly arranged. For example, among the plurality of prisms P1, P2, P3, the first prism P1 may be configured to change the traveling direction of the light to a first direction, the second prism P2 may be configured to change the traveling direction of the light to a second direction different from the first direction, and the third prism P3 may be configured to change the traveling direction of the light to a third direction different from the first and second directions.

Each unit region 1502 is illustrated as including prisms P1, P2, and P3 arranged in a 1×3 format, but is not limited thereto. The prism arrangement in each unit region 1502 may be differently selected according to the number of holographic images of different viewpoints simultaneously provided by the holographic display apparatus 1030. For example, when the holographic display apparatus 1030 provides holographic images of four different viewpoints in the horizontal direction, each unit region 1502 may include prisms of a 1×4 arrangement. In addition, when the holographic display apparatus 1030 provides holographic images of four different viewpoints in the horizontal direction and the vertical direction, each unit region 1502 may include prisms of a 2×2 arrangement.

Referring to FIG. 16, the complex light modulator 1300 may include a plurality of unit regions 1302 arranged in two dimensions. The unit regions 1302 of the complex light modulator 1300 may have the same arrangement as the unit regions 1502 of the prism array 1500 of FIG. 15. For example, when the unit region 1502 of the prism array 1500 includes prisms P1, P2, and P3 of a 1×3 arrangement, the unit region 1302 of the complex light modulator 1300 may include complex pixels X1, X2, and X3 arranged in a 1×3 format. The prisms P1, P2, and P3 of the prism array 1500 may respectively correspond to the complex pixels X1, X2, and X3 of the complex light modulator 1300.

In an example, the plurality of complex pixels X1, X2, and X3 may be configured to reproduce holographic images having different viewpoints. For example, among the plurality of complex pixels X1, X2, and X3, the first complex pixel X1 may operate to reproduce a holographic image of a first viewpoint, the second complex pixel X2 may operate to reproduce a holographic image of a second viewpoint different from the first viewpoint, and the third complex pixel X3 may operate to reproduce a holographic image of a third viewpoint different from the first and second viewpoints.

The processor 1330 may be configured to provide a first holographic data signal for the holographic image of the first viewpoint to the first complex pixel X1, provide a second holographic data signal for the holographic image of the second viewpoint to the second complex pixel X2, and provide a third holographic data signal for the holographic image of the third viewpoint to the third complex pixel X3.

For example, each unit region 1302 is illustrated as including complex pixels of a 1×3 arrangement, but is not limited thereto. The arrangement of the complex pixels in each unit region 1302 may be differently selected according to the number of holographic images of different viewpoints to be simultaneously provided by the holographic display apparatus 1030. For example, when the holographic display apparatus 1030 provides holographic images of four different viewpoints in the horizontal direction, each unit region 1302 may include complex pixels of a 1×4 arrangement. In addition, when the holographic display apparatus 1030 provides holographic images of four different viewpoints in the horizontal and vertical directions, each unit region 1302 may include complex pixels of a 2×2 arrangement.

Example embodiments may provide the holographic display apparatus 1030 that simultaneously reproduces holographic images of multiple viewpoints.

Figure 17:
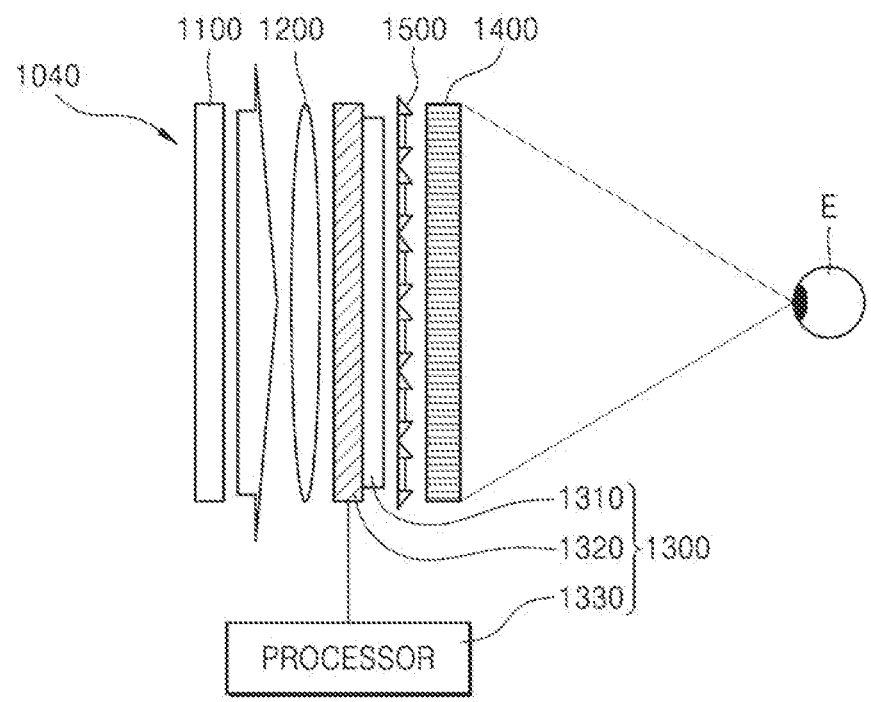
FIG. 17 is a conceptual diagram of a holographic display apparatus according to an example embodiment.

FIG. 17 is a conceptual diagram of a holographic display apparatus 1040 according to an example embodiment. For brevity of description, descriptions substantially the same as those given above with reference to FIGS. 12 and 13 and those given above with reference to FIGS. 14 to 16 may be omitted.

Referring to FIG. 17, the holographic display apparatus 1040 may be provided. The holographic display apparatus 1040 may include the holographic display apparatus 1030 described with reference to FIGS. 14 to 16 and the diffraction prevention film 1400 described with reference to FIGS. 12 and 13.

The diffraction prevention film 1400 may be disposed on an emission surface of the prism array 1500.

Example embodiments may provide the holographic display apparatus 1040 that prevents generation of noise and reproduces holographic images of multiple viewpoints at the same time.

Example embodiments may provide a complex light modulator having high resolution and low noise.

Example embodiments may provide a holographic display apparatus having high resolution and low noise.

Example embodiments may provide a method of generating a holographic pattern for reproducing a holographic image having high resolution and low noise.

However, the effects of the inventive concept are not limited to the above disclosure.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. A complex light modulator comprising:
 a phase modulator; and
 an amplitude modulator,
 wherein the phase modulator and the amplitude modulator are configured to generate a first complex pixel having first complex light modulation characteristics and a second complex pixel having second complex light modulation characteristics,
 wherein the first complex pixel includes first sub-complex pixels that are provided in a 3×3 format and are configured to implement the first complex light modulation characteristics,
 wherein the second complex pixel includes second sub-complex pixels that are provided in a 3×3 format and are configured to implement the second complex light modulation characteristics,
 wherein the first complex pixel and the second complex pixel respectively include at least two first overlapping pixels that are included in the first sub-complex pixels and the second sub-complex pixels, and
 wherein among the sub-complex pixels provided in the 3×3 format, which include the at least two first overlapping pixels, phases of sub-complex pixels respectively provided at positions (1,1), (1,3), (2,2), (3,1), and (3,3) are 0°, phases of sub-complex pixels respectively located at positions (1,2) and (3,2) are 120°, and phases of sub-complex pixels respectively located at positions (2,1) and (2,3) are 240°, where a sub-complex pixel at a position (m,n) is provided at an mth row and nth column of the 3×3 format.

2. The complex light modulator of claim 1, wherein the phase modulator and the amplitude modulator are further configured to generate a third complex pixel having third complex light modulation characteristics,
 wherein a plurality of first overlapping pixels are provided,
 wherein the third complex pixel includes third sub-complex pixels that are provided in a 3×3 format and implement the third complex light modulation characteristics,
 wherein the first complex pixel, the second complex pixel, and the third complex pixel respectively include one of the plurality of first overlapping pixels, and
 wherein the one of the plurality of first overlapping pixels is included in the third sub-complex pixels.

3. The complex light modulator of claim 2, wherein the phase modulator and the amplitude modulator are further configured to generate a fourth complex pixel having fourth complex light modulation characteristics,
 wherein the fourth complex pixel includes fourth sub-complex pixels that are provided in a 3×3 format and are configured to implement the fourth complex light modulation characteristics, wherein the first complex pixel, the second complex pixel, the third complex pixel, and the fourth complex pixel respectively include the one of the plurality of first overlapping pixels, and wherein the one of the plurality of first overlapping pixels is included in the fourth sub-complex pixels.

4. The complex light modulator of claim 3, wherein the first complex pixel and the fourth complex pixel further respectively include a second overlapping pixel that is included in the first sub-complex pixels and the fourth sub-complex pixels.

5. The complex light modulator of claim 1, further comprising a processor configured to provide a holographic data signal to the amplitude modulator, wherein the amplitude modulator includes a spatial light modulator.

6. The complex light modulator of claim 1, wherein the phase modulator includes a phase plate having a plurality of patterns, wherein the plurality of patterns correspond to the first sub-complex pixels and the second sub-complex pixels on a one-to-one basis, and wherein phases of the first sub-complex pixels and phases of the second sub-complex pixels correspond to thicknesses of the plurality of patterns.

7. The complex light modulator of claim 1, wherein phases of the first sub-complex pixels form point symmetry, and phases of the second sub-complex pixels form point symmetry.

8. A holographic display apparatus comprising:
a backlight unit configured to provide light having coherence;
a Fourier lens configured to focus the light; and
a complex light modulator provided in a path of the light,
wherein the complex light modulator includes a first complex pixel having first complex light modulation characteristics and a second complex pixel having second complex light modulation characteristics,
wherein the first complex pixel includes first sub-complex pixels that are provided in a 3×3 format and are configured to implement the first complex light modulation characteristics,
wherein the second complex pixel includes second sub-complex pixels that are provided in a 3×3 format and are configured to implement the second complex light modulation characteristics,
wherein the first complex pixel and the second complex pixel respectively include at least two first overlapping pixels that are included in the first sub-complex pixels and the second sub-complex pixels, and
wherein among the sub-complex pixels provided in the 3×3 format, which include the at least two first overlapping pixels, phases of sub-complex pixels respectively provided at positions (1,1), (1,3), (2,2), (3,1), and (3,3) are 0°, phases of sub-complex pixels respectively located at positions (1,2) and (3,2) are 120°, and phases of sub-complex pixels respectively located at positions (2,1) and (2,3) are 240°, where a sub-complex pixel at a position (m,n) is provided at an mth row and nth column of the 3×3 format.

9. The holographic display apparatus of claim 8, wherein the complex light modulator further includes a third complex pixel having third complex light modulation characteristics,
wherein a plurality of first overlapping pixels are provided, wherein the third complex pixel includes third sub-complex pixels that are provided in a 3×3 format and are configured to implement the third complex light modulation characteristics, wherein the first complex pixel, the second complex pixel, and the third complex pixel respectively include one of the plurality of first overlapping pixels, and wherein the one of the plurality of first overlapping pixels is included in the third sub-complex pixels.

10. The holographic display apparatus of claim 9, wherein the complex light modulator further includes a fourth complex pixel having fourth complex light modulation characteristics, wherein the fourth complex pixel includes fourth sub-complex pixels that are provided in a 3×3 format and implement the fourth complex light modulation characteristics, wherein the first complex pixel, the second complex pixel, the third complex pixel, and the fourth complex pixel respectively include the one of the plurality of first overlapping pixels, and wherein the one of the plurality of first overlapping pixels is included in the fourth sub-complex pixels.

11. The holographic display apparatus of claim 10, wherein the first complex pixel and the fourth complex pixel further respectively include a second overlapping pixel that is included in the first sub-complex pixels and the fourth sub-complex pixels.

12. The holographic display apparatus of claim 8, wherein the complex light modulator further includes a phase modulator and an amplitude modulator that are configured to define the first complex pixel and the second complex pixel.

13. The holographic display apparatus of claim 8, further comprising a diffraction prevention film provided in the path of the light, wherein the diffraction prevention film is configured to enlarge a beam diameter of the light.

14. The holographic display apparatus of claim 8, further comprising a prism array provided in the path of the light, wherein the prism array is configured to adjust a light path of a first beam passing through the first complex pixel, such that the first beam travels in a first direction, and adjusts a light path of a second beam passing through the second complex pixel, such that the second beam travels in a second direction different from the first direction.

15. The holographic display apparatus of claim 8, wherein phases of the first sub-complex pixels form point symmetry, and phases of the second sub-complex pixels form point symmetry.

16. A method of generating a hologram pattern, the method comprising:

determining complex light modulation characteristics of complex pixels provided in two dimensions;

determining light modulation characteristics of sub-complex pixels that are provided in a 3×3 format and are included in each of the complex pixels, based on the complex light modulation characteristics of the complex pixels; and generating overlapping pixels by overlapping target pixels, which are immediately adjacent to each other and have a same phase, among the sub-complex pixels included in each of complex pixels adjacent to each other among the complex pixels, wherein the adjacent complex pixels respectively include the overlapping pixels based on generating the overlapping pixels, and wherein among the sub-complex pixels provided in the 3×3 format, which include the overlapping pixels, phases of sub-complex pixels respectively provided at positions (1,1), (1,3), (2,2), (3,1), and (3,3) are 0°, phases of sub-complex pixels respectively located at positions (1,2) and (3,2) are 120°, and phases of sub-complex pixels respectively located at positions (2,1) and (2,3) are 240°, where a sub-complex pixel at a position (m,n) is provided at an mth row and nth column of the 3×3 format.

17. The method of claim 16, wherein the complex light modulation characteristics of the sub-complex pixels provided in the 3×3 format are determined such that amplitudes of the sub-complex pixels form point symmetry and phases of the sub-complex pixels form point symmetry.

18. The method of claim 16, wherein phases of the overlapping pixels are the same as phases of corresponding overlapping target pixels,
wherein amplitudes of the overlapping pixels are equal to a sum of amplitudes of the corresponding overlapping target pixels, and
wherein each of the overlapping pixels is generated by overlapping the corresponding overlapping target pixels.

19. The method of claim 16, wherein the complex light modulation characteristics of the complex pixels are determined based on amplitude information and phase information of a holographic image corresponding to the complex pixels based on a resolution of a complex light modulator obtained based on generating the overlapping pixels.

20. A complex light modulator comprising:
an amplitude modulator configured to modulate an amplitude of light;
a phase modulator configured to modulate a phase of the light; and
a processor configured to provide a holographic data signal to the amplitude modulator,
wherein the phase modulator and the amplitude modulator are further configured to generate a first complex pixel having first complex light modulation characteristics and a second complex pixel having second complex light modulation characteristics,
wherein the first complex pixel includes first sub-complex pixels that are provided in a 3×3 format,
wherein the second complex pixel includes second sub-complex pixels that are provided in a 3×3 format, and
wherein the first complex pixel and the second complex pixel respectively include at least two first overlapping pixels, the at least two first overlapping pixels being two of the first sub-complex pixels and two of the second sub-complex pixels, and
wherein among the sub-complex pixels provided in the 3×3 format, which include the at least two first overlapping pixels, phases of sub-complex pixels respectively provided at positions (1,1), (1,3), (2,2), (3,1), and (3,3) are 0°, phases of sub-complex pixels respectively located at positions (1,2) and (3,2) are 120°, and phases of sub-complex pixels respectively located at positions (2,1) and (2,3) are 240°, where a sub-complex pixel at a position (m,n) is provided at an mth row and nth column of the 3×3 format.

* * * * *